(12) United States Patent
Hong

(10) Patent No.: US 11,142,120 B2
(45) Date of Patent: Oct. 12, 2021

(54) VEHICLE LAMP WITH ROTATING LIGHT SOURCE

(71) Applicants: Hyundai Motor Company, Seoul (KR); Kia Motors Corporation, Seoul (KR)

(72) Inventor: Seung-Pyo Hong, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/818,256

(22) Filed: Mar. 13, 2020

(65) Prior Publication Data

US 2021/0031679 A1 Feb. 4, 2021

(30) Foreign Application Priority Data

Aug. 2, 2019 (KR) .......................... 10-2019-0094200

(51) Int. Cl.
*B60Q 1/30* (2006.01)
*F21S 43/14* (2018.01)
*B60Q 1/00* (2006.01)
*F21V 14/02* (2006.01)
*H05B 45/10* (2020.01)
*F21W 103/60* (2018.01)

(52) U.S. Cl.
CPC ............. *B60Q 1/30* (2013.01); *B60Q 1/0076* (2013.01); *B60Q 1/0094* (2013.01); *F21S 43/14* (2018.01); *F21V 14/02* (2013.01); *H05B 45/10* (2020.01); *F21W 2103/60* (2018.01)

(58) Field of Classification Search
CPC .......... B60Q 1/14; B60Q 1/30; B60Q 1/0076; B60Q 1/0088; B60Q 1/0094; F21S 43/14; F21V 14/02; H05B 45/10
See application file for complete search history.

(56) References Cited

U.S. PATENT DOCUMENTS

| 4,319,306 | A | * | 3/1982 | Stanuch | ............... | B60Q 1/2611 |
| | | | | | | 362/237 |
| 5,302,965 | A | * | 4/1994 | Belcher | .................... | G09F 9/33 |
| | | | | | | 340/815.43 |
| 5,422,623 | A | * | 6/1995 | Bader | .................. | B60Q 1/2611 |
| | | | | | | 340/331 |

(Continued)

FOREIGN PATENT DOCUMENTS

KR   10-2018-0043038 A    4/2018

*Primary Examiner* — Amy Cohen Johnson
*Assistant Examiner* — Syed M Kaiser
(74) *Attorney, Agent, or Firm* — Morgan Lewis & Bockius LLP

(57) ABSTRACT

A vehicle lamp with a rotating light source may include a signal receiver which receives a signal from one or more sensors provided in a vehicle; a light emitting diode (LED) portion having one or more LED elements configured to emit light toward an outside of the vehicle; a controller connected to the one or more LED elements and configured to control a light generation amount of the one or more LED elements; a signal transmitter which is connected to the signal receiver, receives the signal from the signal receiver and transmits the received signal to the controller; and a driver coupled to the LED portion and configured to rotate the LED portion, wherein the controller controls the light generation amount of the one or more LED elements in a response to the signal.

19 Claims, 25 Drawing Sheets

(56) References Cited

U.S. PATENT DOCUMENTS

| | | | | |
|---|---|---|---|---|
| 6,018,899 | A * | 2/2000 | Hanitz | G09F 13/02 40/431 |
| 6,183,100 | B1 * | 2/2001 | Suckow | B60Q 1/2611 362/35 |
| 6,462,669 | B1 * | 10/2002 | Pederson | B60Q 1/2611 315/200 A |
| 6,705,745 | B1 * | 3/2004 | Pederson | B60Q 1/2611 362/284 |
| 8,201,974 | B1 * | 6/2012 | Smith | F21S 8/003 362/257 |
| 8,760,514 | B2 * | 6/2014 | Chien | F21S 9/022 348/143 |
| 9,146,028 | B2 * | 9/2015 | Logan | F21V 5/007 |
| 9,534,756 | B2 * | 1/2017 | Takahira | F21S 41/176 |
| 9,539,952 | B2 * | 1/2017 | Gebhard | B60R 11/00 |
| 9,950,657 | B2 * | 4/2018 | Dellock | B60Q 1/085 |
| 10,184,634 | B2 | 1/2019 | Shim | |
| 10,319,272 | B1 * | 6/2019 | Carter | G06F 3/012 |
| 10,375,789 | B2 * | 8/2019 | Bosua | H05B 45/20 |
| 10,443,799 | B2 * | 10/2019 | Shyu | F21S 41/16 |
| 2005/0047167 | A1 * | 3/2005 | Pederson | B60Q 1/2611 362/542 |
| 2007/0263376 | A1 * | 11/2007 | Wilkinson | B60Q 1/2611 362/35 |
| 2010/0097448 | A1 * | 4/2010 | Gilbert | G09G 5/36 348/51 |
| 2010/0155766 | A1 * | 6/2010 | Ku | H01L 25/167 257/99 |
| 2015/0159818 | A1 * | 6/2015 | Dong | F21V 7/06 315/151 |
| 2016/0313636 | A1 * | 10/2016 | Chien | F21S 9/022 |
| 2016/0347236 | A1 * | 12/2016 | Yatsuda | F21K 9/64 |
| 2017/0050555 | A1 * | 2/2017 | Chen | F21S 41/675 |
| 2017/0299139 | A1 * | 10/2017 | Masuda | F21S 41/148 |
| 2017/0320429 | A1 * | 11/2017 | Akiyama | B60Q 1/1423 |
| 2018/0009372 | A1 * | 1/2018 | Hammock | B60Q 1/445 |
| 2018/0106453 | A1 | 4/2018 | Shim | |
| 2018/0332204 | A1 * | 11/2018 | Chien | F21V 21/30 |
| 2019/0016254 | A1 * | 1/2019 | Salter | F21V 9/30 |
| 2019/0041228 | A1 * | 2/2019 | Singhal | G05D 1/0217 |
| 2019/0143883 | A1 * | 5/2019 | Shibata | H05B 47/115 315/82 |
| 2019/0253670 | A1 * | 8/2019 | Chien | F21S 4/28 |
| 2019/0365014 | A1 * | 12/2019 | Andon | A43B 3/0005 |

* cited by examiner

FIG.21
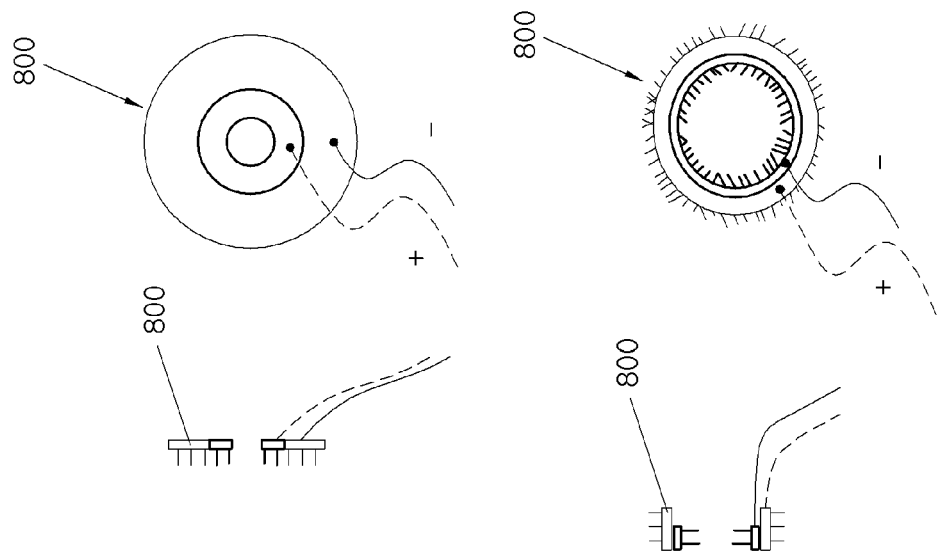
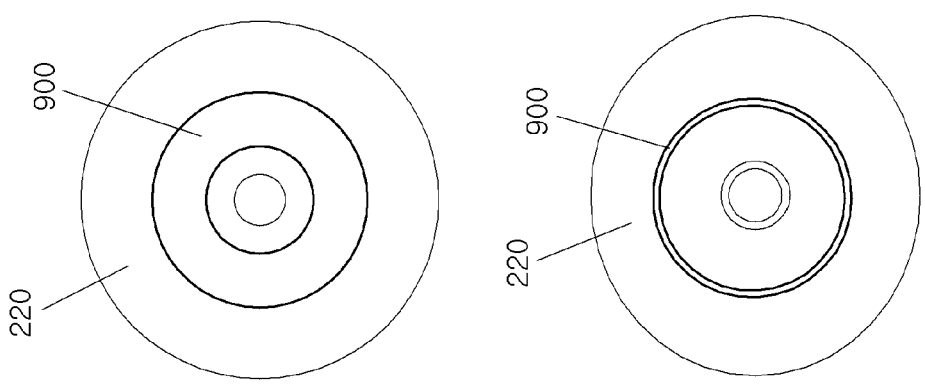
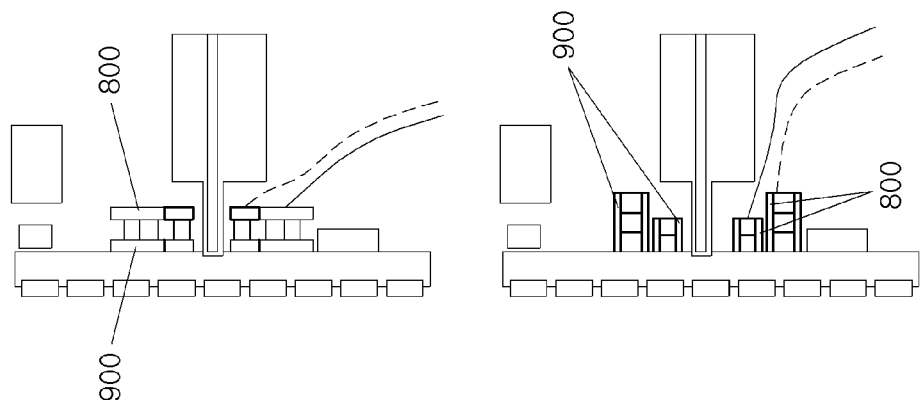

VEHICLE LAMP WITH ROTATING LIGHT SOURCE

CROSS-REFERENCE(S) TO RELATED APPLICATIONS

The present application claims priority to Korean Patent Application No. 10-2019-0094200, filed on Aug. 2, 2019, the entire contents of which is incorporated herein for all purposes by this reference.

BACKGROUND OF THE PRESENT INVENTION

Field of the Invention

The present invention relates to a vehicle lamp with a rotating light source. More particularly, it relates to a vehicle lamp with a rotating light source, which is capable of reducing the number of light emitting diodes (LEDs) provided therein and improving heat dissipation performance.

Description of Related Art

Recently, a matrix headlamp technique is being applied to headlamps of vehicles. To implement the matrix headlamp technique, one or more light emitting diode (LED) elements are concentrated in a headlamp. Light emission of each LED element is controlled such that it is possible to remove only light which is expected to reach a driver of an oncoming vehicle during high beam driving. A technique is also being studied in which a specific type of light is formed on a front surface of a vehicle by disposing a liquid crystal display (LCD) screen on front surfaces of one or more LED elements and varying transparency of the LCD screen to a specific shape.

To implement the matrix headlamp technique, a circuit for independently controlling the one or more LED elements is required. Furthermore, lots of large and small LED elements, such as micro LEDs, pixel lightings, and the like, are required.

However, the LED element generates heat during light emission. When lots of large and small LEDs are concentrated on a single printed circuit board (PCB), generated heat is excessive such that heat resistance performance of the PCB and the LEDs is significantly degraded. Even when an interval between the LED elements is minimized, the LED elements inevitably overlap each other such that a boundary line is inevitably generated in emitted light.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle lamp with a rotating light source, which is configured for improving heat resistance as the number of light emitting diode (LED) elements is reduced and generating surface emission without a boundary line.

Other objects and advantages of the present invention may be understood by the following description and become apparent with reference to the exemplary embodiments of the present invention. Also, it is obvious to those skilled in the art to which an exemplary embodiment of the present invention pertains that the objects and advantages of the present invention may be realized by the means as claimed and combinations thereof.

In accordance with various exemplary embodiments of the present invention, there is provided a vehicle lamp with a rotating light source, which includes a signal receiver which receives a signal from one or more sensors provided in a vehicle, a light emitting diode (LED) portion having one or more LED elements configured to emit light toward an outside of the vehicle, a controller configured to control a light generation amount of the one or more LED elements, a signal transmitter which is connected to the signal receiver, receives the signal from the signal receiver and transmits the received signal to the controller, and a driver coupled to the LED portion and configured to rotate the LED portion, wherein the controller controls the light generation amount of the one or more LED elements in a response to the signal.

The controller may be mounted on a rear surface of the LED portion, the LED portion may be fixed to a rotation shaft which protrudes from the driver toward the outside of the vehicle, the signal transmitter may transmit the signal to the controller through the rotation shaft, the signal may include an angle with respect to a precedent vehicle and an outside image of the vehicle, the signal transmitter may transmit a lamp auto switch operation signal, a high beam operation signal, and the number of revolutions of the driver in addition to the signal, and the controller may select any one among one or more stored operation patterns in a response to various signals received from the signal transmitter.

Furthermore, when a lamp ON signal is applied, the controller may be configured to control a rotation angle of the LED portion to become a reference state.

Furthermore, the controller may measure a time or the number of revolutions, which is controlled to make the rotation angle of the LED portion being the reference state, and control light generation of the one or more LED elements and an operation of the driver to implement the selected operation pattern by setting the measured time or the measured number of revolutions as one cycle.

Furthermore, the controller may operate the driver to rotate the LED portion at a specific rotation speed and may implement the selected operation pattern by allowing the one or more LED elements to emit light according to the rotation angle of the LED portion. The controller may detect a variation in angular velocity of the LED portion due to inertia generated according to a vehicle attitude and vary an emission timing of the one or more LED elements according to the detected variation in angular velocity.

In accordance with various exemplary embodiments of the present invention, there is provided a vehicle lamp with a rotating light source, which includes a light emitting diode (LED) portion having one or more LED elements configured to emit light toward an outside of the vehicle, a controller configured to control a light generation amount of the one or more LED elements, a driver coupled to the LED portion and configured to rotate the LED portion, a signal receiver which receives a signal from one or more sensors provided in a vehicle, a driving force generator configured to select a driving level in a response to the signal and apply the selected driving level to the driver, and a signal transmitter which is connected to the signal receiver, receives the signal from the signal receiver and transmits the received signal to the driving force generator, wherein the controller varies the number of revolutions of the LED portion according to the driving level.

Furthermore, the controller may detect the number of revolutions of the LED portion and control the light generation amount of the one or more LED elements according to a variation of the number of revolutions of the LED portion.

Furthermore, a position signal transmitter may be provided on one side of the driver, a position signal receiver configured to detect the position signal transmitter may be provided in the LED portion, and when the position signal transmitter is detected, the position signal receiver may transmit a detection signal to the controller, and the controller may be configured to control the light generation amount of the one or more LED elements in a response to the detection signal.

Furthermore, the signal may include an angle with respect to a precedent vehicle and an outside image of the vehicle, the driving force generator may receive a lamp auto switch operation signal, a high beam operation signal, and the number of revolutions of the driver in addition to the signal, the driving force generator may select any one among one or more stored operation patterns in a response to the received various signals, the LED portion may rotate with a specific number of revolutions according to the selected operation pattern, and the controller may be configured to control light emission of the one or more LED elements to implement the selected operation pattern whenever the LED portion rotates once.

Furthermore, the LED portion may include one or more rotating plates fixed to a rotation shaft, and whenever the number of revolutions of the LED portion is a value which is obtained by dividing a turn-on frequency of the one or more LED elements by the number of the one or more rotating plates, the controller may be configured to control light emission of the one or more LED elements to implement the operating pattern selected by the signal transmitter.

Furthermore, when the number of revolutions of the LED portion increases, the controller may recognize as code 1, when the number of revolutions of the LED portion decreases, the controller may recognize as code 0, and whenever a combination of code 1 and code 0, which is recognized during a unit time, is changed, the controller may be configured to control the light emission of the one or more LED elements to implement the operation pattern selected by the signal transmitter.

Furthermore, the LED portion may include one or more rotating plates which are fixed to a rotation shaft protruding from the driver toward the outside of the vehicle and form an angle ranging from 0 to 180 degrees in a direction of the rotation shaft and in a direction of the outside of the vehicle.

Furthermore, the one or more rotating plates may have different distances from a rotating portion, the one or more rotating plates may be formed in a rectangular shape, an end portion of one side of each of the one or more rotating plates may be bonded to the rotation shaft, an arc-shaped wing plate may be provided on sides opposite a rotation direction among surfaces of the one or more rotating plates, and one or more LED elements may be mounted along a curvature of the wing plate.

Furthermore, the rotating plate may be in a form of a disc, a center portion of the rotating plate may be connected to an end portion of the rotation shaft, and the one or more LED elements may be a quadrangular shape. The one or more LED elements may emit light of any one among red, green, blue, or yellow color.

Furthermore, any one vertex of a first LED element among the one or more LED elements may be mounted to overlap the rotation shaft, and a junction of the first LED element may be mounted to not overlap the rotation shaft.

Furthermore, a second LED element may be mounted to be farther away in distance from the rotation shaft than the first LED element, and a third LED element may be mounted to be farther away in distance from the rotation shaft than the second LED element.

Furthermore, one side of the second LED element may be mounted to be located on a first imaginary line which passes the rotation shaft and one side of the first LED element. A center portion of the second LED element may be located in the first imaginary circle, and simultaneously, a vertex thereof may be located on a circumference of the first imaginary circle. When a portion in which the first LED element is located is a fourth quadrant of a first imaginary circle, the second LED element may be located in a second quadrant. The first imaginary circle may be centering on the rotation shaft and may have a diameter which is equal to a diagonal length of the first LED element.

Furthermore, one side of a third LED element may be mounted to be located on a second imaginary line. The second imaginary line may be a line which is perpendicular to the first imaginary line and passes the rotation shaft and the one side of the first LED element. The third LED element may be located outside the first imaginary circle, and simultaneously, a vertex of the third LED element may be located on the circumference of the first imaginary circle. When a portion in which the first LED element is located is the fourth quadrant of the first imaginary circle, the third LED element may be located in a first quadrant.

Furthermore, a fourth LED element may be mounted to be farther away in distance from the rotation shaft than the third LED element. A center portion of the fourth LED element may be located in the second imaginary circle, and simultaneously, a vertex thereof may be located on a circumference of the second imaginary circle. The second imaginary circle may be centering on the rotation shaft and may have a diameter which is equal to or less than two times the diagonal length of the first LED element. One side of the fourth LED element may be mounted to be located on the second imaginary line. When a portion in which the first LED element is located is the fourth quadrant of the first imaginary circle, the fourth LED element may be located in a third quadrant.

Furthermore, the center portion of the second LED element may be located in the first imaginary circle, and simultaneously, the vertex thereof may be located on the circumference of the first imaginary circle. The first imaginary circle may be centering on the rotation shaft and may have a diameter which is equal to a diagonal length of the first LED element. The first imaginary line may be a line connecting the rotation shaft to the center portion of the first LED element.

Furthermore, the third LED element may be located in the second imaginary circle, and simultaneously, located outside the first imaginary circle, and the center portion of the third LED element may be mounted to be located on the second imaginary line. The second imaginary circle may be centering on the rotation shaft and may have a diameter which is equal to or less than two times the diagonal length of the first LED element. The second imaginary line may be a line which is perpendicular to the first imaginary line and passes the rotation shaft.

Furthermore, the third LED element may be divided into a third-first LED element and a third-second LED element, and the third-first LED element and the third-second LED element may be symmetric about the rotation shaft.

Furthermore, three first LED elements may be mounted to have the same angle about the rotation shaft.

Furthermore, three second LED elements may be mounted located outside the first imaginary circle, and simultaneously, located in the second imaginary circle. Centers of the three second LED elements may be located on three first imaginary lines extending from the rotation shaft toward the centers of the three first LED elements. The first imaginary circle may be centering on the rotation shaft and may have a diameter which is equal to a diagonal length of the first LED element. The second imaginary circle may be centering on the rotation shaft and may have a diameter which is equal to or less than two times the diagonal length of the first LED element.

Furthermore, six third LED elements may be mounted to have the same angle about the rotation shaft. The six third LED elements may be located outside the second imaginary circle, and simultaneously, any one vertex of the six third LED elements may be located on the circumference of the second imaginary circle. Centers of the six third LED elements may be located on three second imaginary lines to be symmetric about the rotation shaft. The second imaginary line may be a line which extends from the rotation shaft to be perpendicular to each first imaginary line.

Furthermore, the controller may flicker a predetermined number of the one or more LED elements provided in the LED portion according to a rotation angle of the LED portion and vary a dimming time, during which the flickering LED element among the one or more LED elements is turned off or on slowly, according to the rotation speed of the LED portion, and the dimming time may increase as a size of the flickering LED element is increased, as a position of the flickering LED element is closer to the rotation shaft protruding from the driver toward the outside of the vehicle, and as a rotation speed of the LED portion becomes slower.

The vehicle lamp may further include a power transmitter which receives external electricity, and a power receiver which transfers electricity from the power transmitter to the LED portion.

Furthermore, the power receiver may be a brush wire which is located behind the LED portion, and the power transmitter may be a slip ring which is located behind the LED portion to be in contact with the brush wire.

Furthermore, the power receiver may be an electromagnet which is located behind the LED portion, and the power transmitter may be a coil which is located on a rear surface of the LED portion to face the electromagnet.

Furthermore, the power receiver may be a positive receiving gear and a negative receiving gear which are located behind or above the LED portion, and the power transmitter may be a positive transmitting gear which is located on the rear surface or a side surface of the LED portion to be engaged with the positive receiving gear and a negative transmitting gear which is located on the rear surface or the side surface of the LED portion to be engaged with the negative receiving gear.

Furthermore, the vehicle lamp may be applied to a rear combination lamp.

In accordance with yet another exemplary embodiment of the present invention, there is provided a vehicle lamp with a rotating light source, which includes a signal receiver which receives a signal from one or more sensors provided in a vehicle, a light emitting diode (LED) portion having one or more LED elements configured to emit light toward an outside of the vehicle, a controller configured to control a light generation amount of the one or more LED elements, a signal transmitter which is connected to the signal receiver, receives the signal from the signal receiver and transmits the received signal to the controller, a driver coupled to the LED portion and configured to rotate the LED portion, a driving force generator which receives the signal from the signal transmitter, a position signal transmitter provided on one side of the driver, and a position signal receiver provided in the LED portion and configured to detect the position signal transmitter, wherein the controller controls a light generation amount of the one or more LED elements in a response to the received signal, the driving force generator varies the number of revolutions of the LED portion in a response to the received signal, when the position signal transmitter is detected, the position signal receiver transmits a detection signal to the controller, and the controller may be configured to control the light generation amount of the one or more LED elements according to the signal received from the signal transmitter and then controls the light generation amount of the one or more LED elements according to the detection signal.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 21, FIG. 22 and FIG. 23 are exemplary diagrams illustrating a power receiver and a power transmitter.

Figure 1:
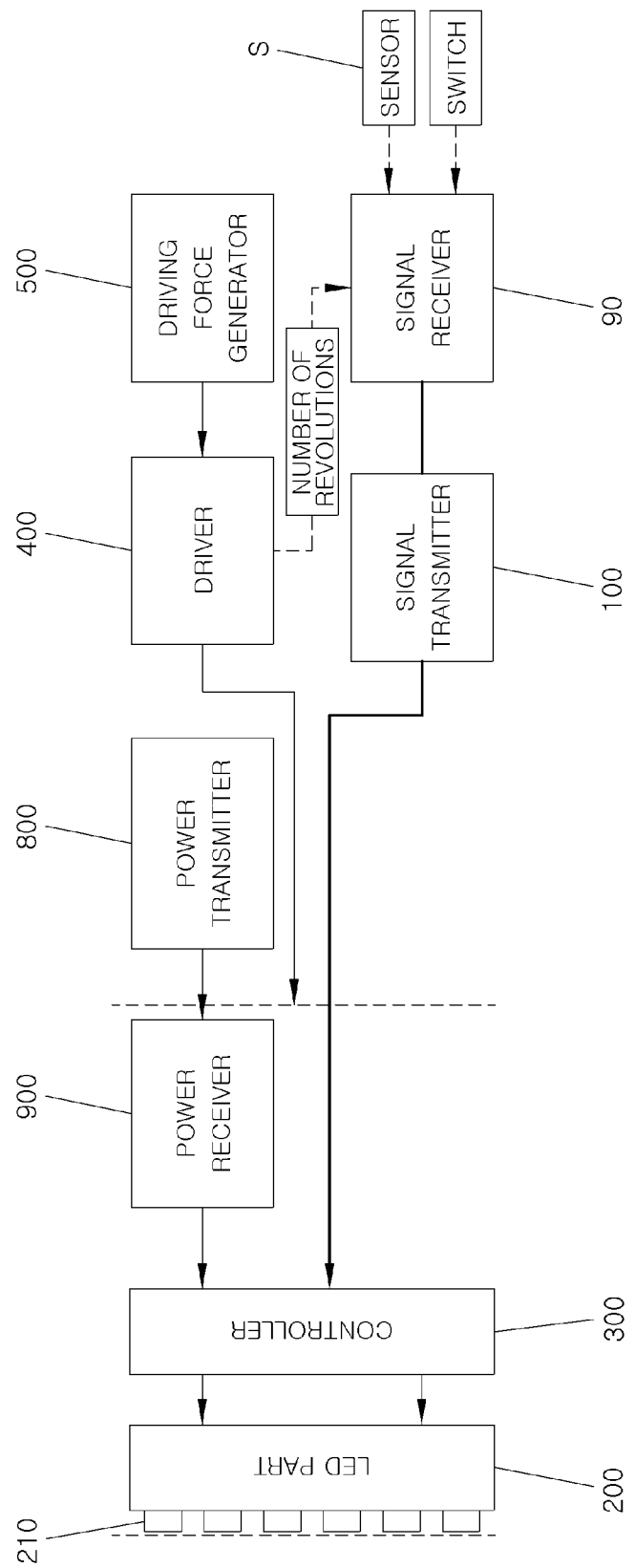
FIG. 1 and FIG. 2 are block diagrams illustrating a vehicle lamp with a rotating light source according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a vehicle lamp with a rotating light source according to an exemplary embodiment of the present invention will be described with reference to the accompanying drawings.

Figure 2:
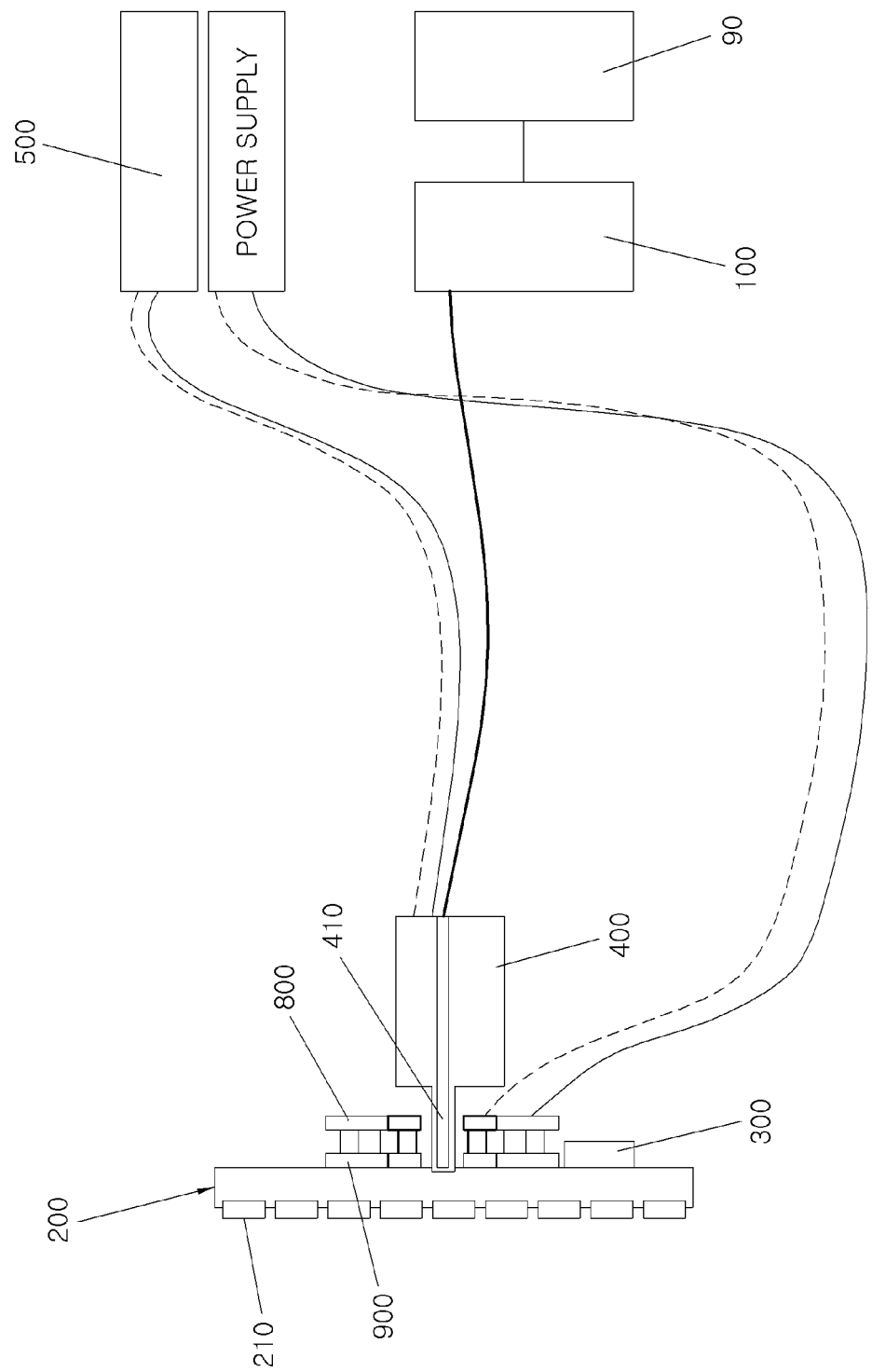
Figure 3:
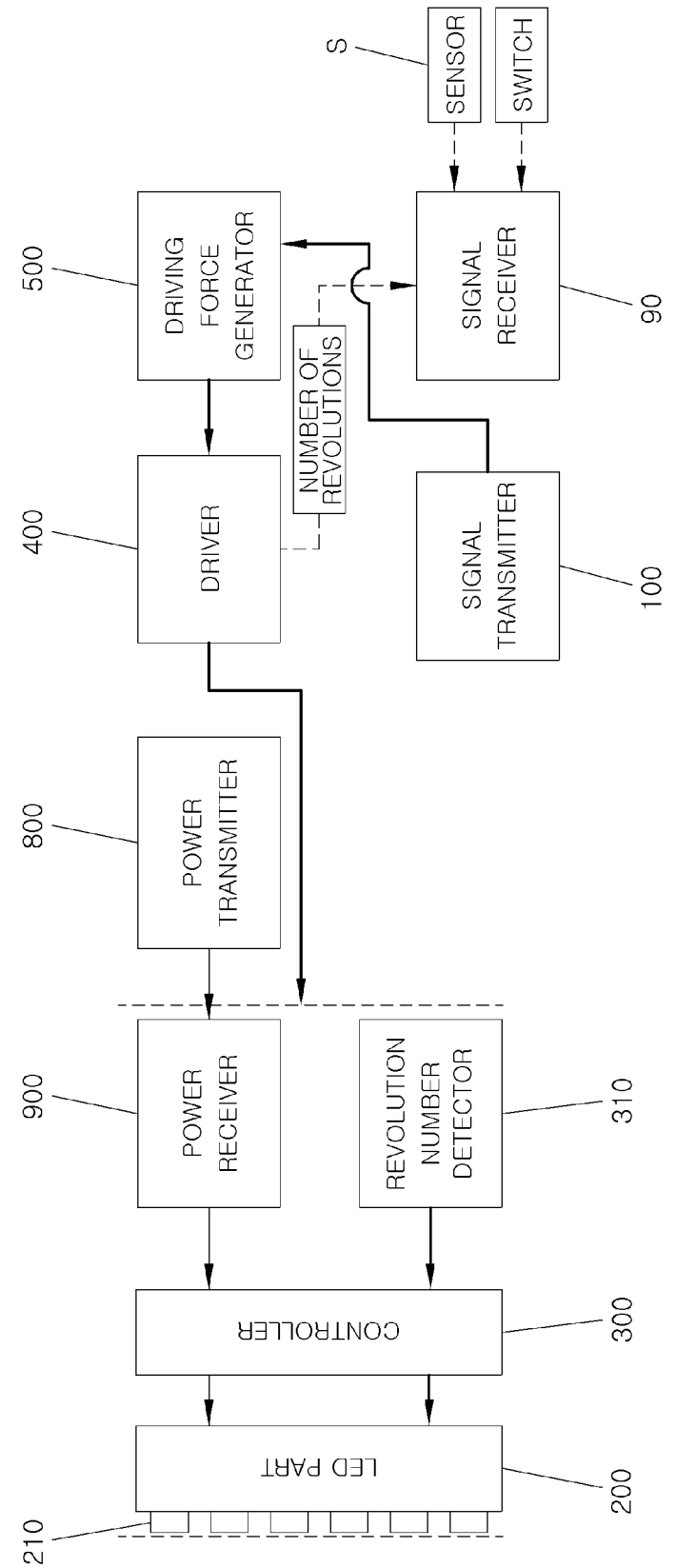
FIG. 3 and FIG. 4 are block diagrams illustrating a vehicle lamp with a rotating light source according to various exemplary embodiments of the present invention.
Figure 4:
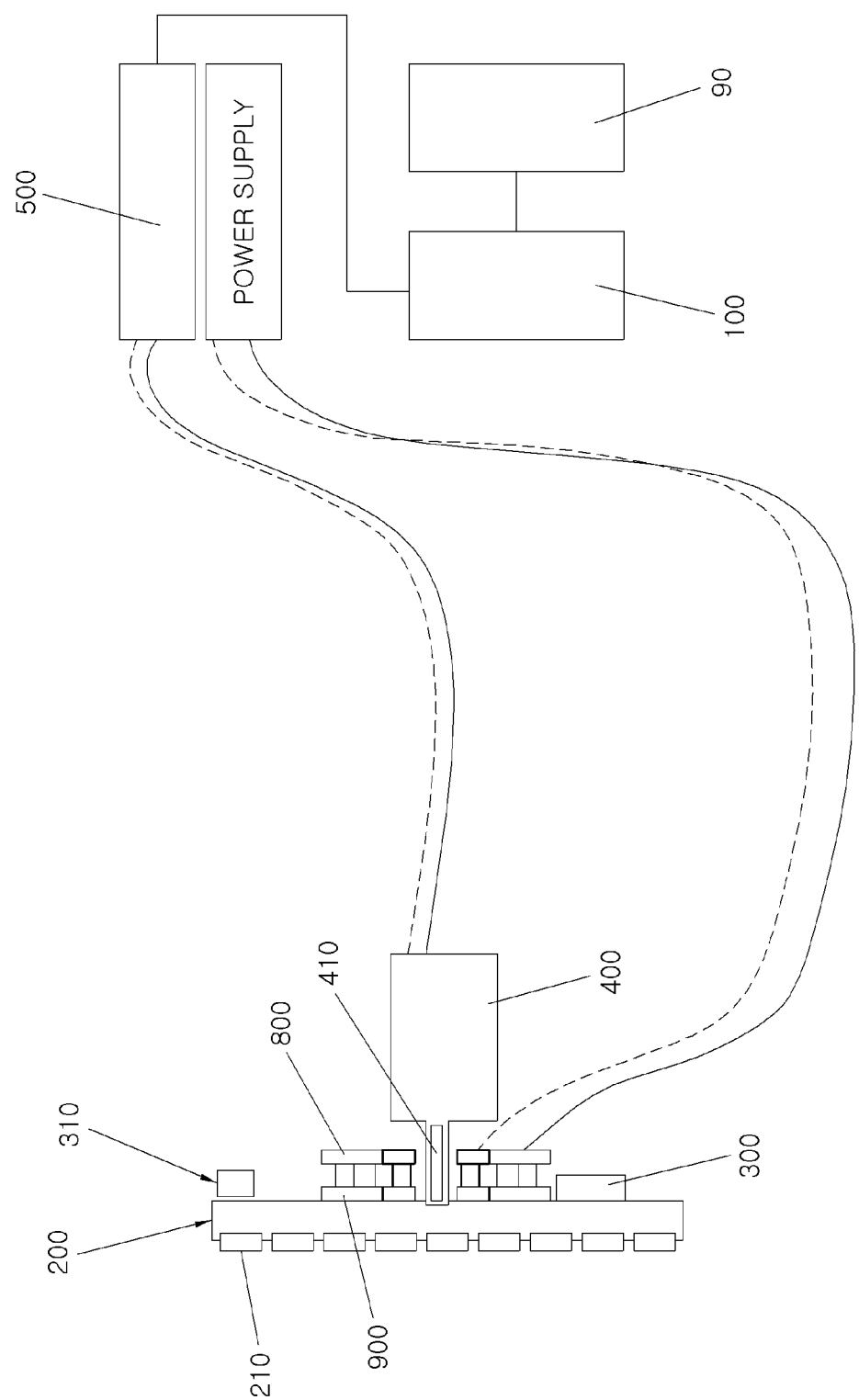
Figure 9:
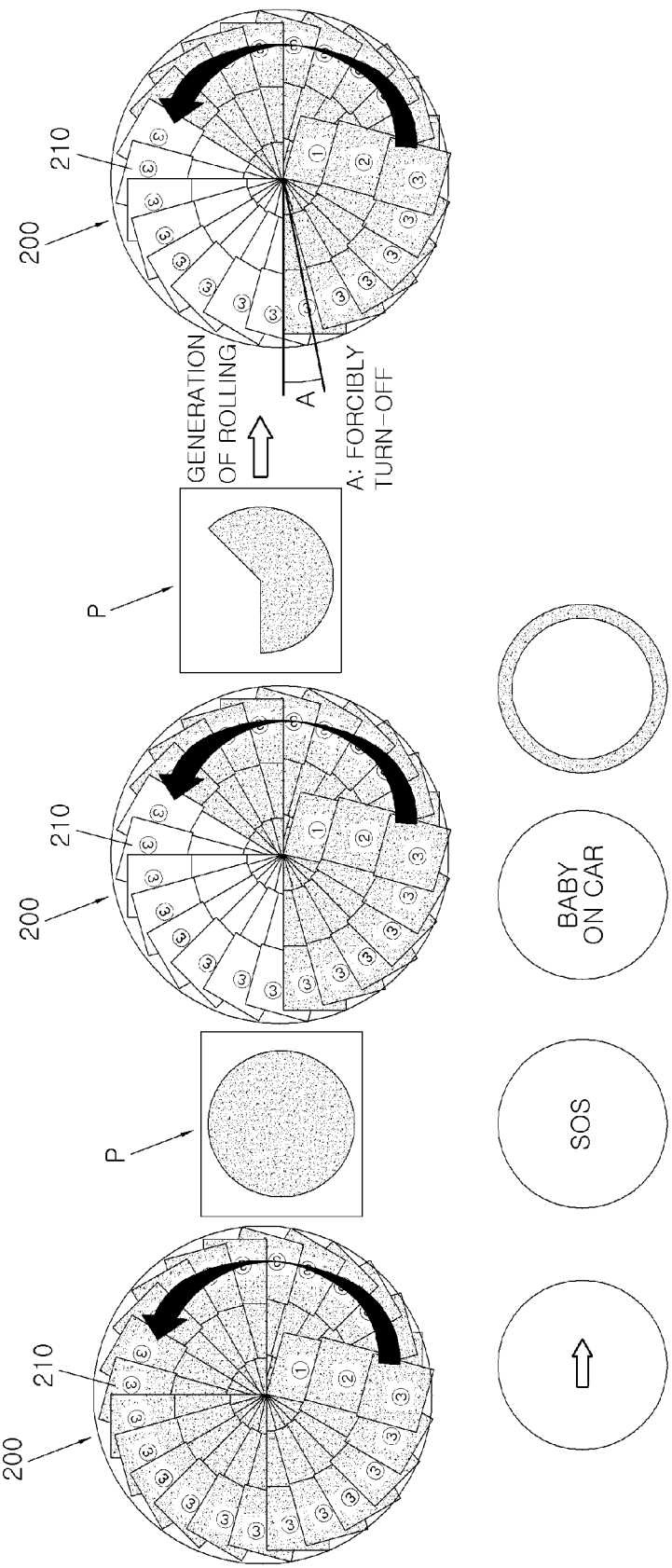
FIG. 9 is an exemplary diagram illustrating an operation of a vehicle lamp with a rotating light source of an exemplary embodiment of the present invention shown in FIG. 1.

As shown in FIGS. 1, 2, and 9, a vehicle lamp with a rotating light source according to various exemplary embodiments of the present invention includes a signal receiver 90 which receives a signal from one or more sensors S provided in a vehicle, a light emitting diode (LED) portion 200 having one or more LED elements 210 for emitting light toward a front side of the vehicle, a controller 300 for controlling a light generation amount of the one or more LED elements 210, a signal transmitter 100 which receives a signal from the signal receiver 90 and transmits the received signal to the controller 300, a driver 400 for rotating the LED portion 200, a power transmitter 800 which receives external electricity, and a power receiver 900 which transfers electricity from the power transmitter 800 to the LED portion 200.

The signal receiver 90 receives signals from sensors S mounted on various portions of the vehicle except for the vehicle lamp. The one or more sensors S transmit information on front and rear sides of the vehicle, an atmosphere temperature, an amount of sunlight reaching a windshield, and the like to the signal receiver 90.

The signal transmitter 100 transmits a signal to the controller 300, and the controller 300 controls a light generation amount of the one or more LED elements 210 in a response to the signal. The signal transmitter 100 may transmit a signal to the controller 300 using pulse width modulation (PWM) communication or controller area network (CAN) communication.

For example, the controller 300 is provided on a rear surface of the LED portion 200. The LED portion 200 is fixed to a rotation shaft 410 which protrudes from the driver 400 toward the front side of the vehicle. The signal transmitter 100 transmits a signal to the controller 300 through the rotation shaft 410.

The signal includes an angle with respect to a precedent vehicle and a front side image of the vehicle. In addition to the above-described various signals, the signal transmitter 100 transmits a lamp auto switch operation signal, a high beam operation signal, and the number of revolutions of the driver 400 to the controller 300. The controller 300 selects any one among one or more stored operation patterns P in a response to the various signals received from the signal transmitter 100.

The signal transmitter 100 may not transmit a signal to the controller 300, select any one among the one or more stored operation patterns P in a response to the various signals, and transmit the selected operation pattern P to the controller 300 using PWM communication or CAN communication.

When a lamp ON signal is applied, the controller 300 controls a rotation angle of the LED portion 200 to make the rotation angle of the LED portion 200 being in a reference state. For example, the controller 300 measures a time or the number of revolutions of the LED portion 200, which is adjusted to make the rotation angle of the LED portion 200 being in a reference state, and controls light generation of the one or more LED elements 210 and an operation of the driver 400 to implement the selected operation pattern P by setting the measured time or the measured number of revolutions as one cycle.

Alternatively, the controller 300 may operate the driver 400 to rotate the LED portion 200 at a specific rotation speed and may control the one or more LED elements 210 to emit light according to a rotation angle of the LED portion 200 to implement the selected operation pattern P.

Also alternatively, the controller 300 may detect a variation in angular velocity of the LED portion 200 due to inertia which is generated according to a vehicle attitude and vary an emission timing of the one or more LED elements 210 according to the detected variation in angular velocity. A height of the light emitted from the LED portion 200 may be varied from the ground according to the vehicle attitude, and an irradiated area may be different in shape from a previously determined area according to a variation in height of left and right suspensions. The emission timing of the one or more LED elements 210 is varied according to the detected variation in angular velocity such that it is possible to prevent variations in height of the light and in shape of a surface on which the light reaches.

An instantaneous angular velocity of the LED element 210 may be varied due to rolling which is generated in a vehicle body while driving. When the instantaneous angular velocity is varied, an absolute position of the LED element 210 is varied based on the ground. The controller 300 estimates a variation in instantaneous angular velocity of the LED element 210 due to the rolling on the basis of information which is acquired through a position signal transmitter 600 and a position signal receiver 700 or information which is acquired from the signal receiver 90. The controller 300 turns off some of the LED elements 210, which operate to implement a specific pattern P, according to the estimated variation in instantaneous angular velocity (see FIG. 9). The LED elements 210 may be preset to be turned off or to be additionally turned on according to each specific pattern P.

As shown in FIGS. 3, 4, 9, and 10, a vehicle lamp with a rotating light source according to various exemplary embodiments of the present invention includes a signal receiver 90 which receives a signal from one or more sensors S provided in a vehicle, a signal transmitter 100 which receives a signal from the signal receiver 90 and transmits the received signal to a driving force generator 500, the driving force generator 500 which receives the signal from the signal transmitter 100, an LED portion 200 having one or more LED elements 210 for irradiating light toward a front side of a vehicle, a controller 300 for controlling a light generation amount of the one or more LED elements 210, a driver 400 for rotating the LED portion 200, a power transmitter 800 which receives external electricity, and a power receiver 900 which transfers electricity from the power transmitter 800 to the LED portion 200.

The signal transmitter 100 transmits an angle with respect to a precedent vehicle and a front side image of the vehicle to the driving force generator 500 as a signal. In addition to the above signal, the driving force generator 500 receives a lamp auto switch operation signal, a high beam operation signal, and the number of revolutions of the driver 400 from a main control unit (MCU) which is provided in the vehicle.

The driving force generator 500 selects a driving level according to the received various signals and applies the selected driving level to the driver 400. The driver 400 varies the number of revolutions of the LED portion 200 according to the driving level.

For example, the driving force generator 500 may receive external power and apply a voltage, which is adjusted according to the driving level, to the driver 400 in which a motor is provided. In the instant case, the driving force generator 500 adjusts a PWM duty ratio through an element, such as an intelligent power switch or the like, to apply a constant voltage to the driver 400.

Alternatively, the driving force generator 500 may include a calculator for selecting a driving level and an operation portion which generates a rotating force according to the driving level or receives a rotating force from an engine to vary the rotating force to a specific number of revolutions (e.g., a gear assembly connected to a motor or connected to the engine). In the instant case, the driver 400 receives the rotating force from the operation portion at the driving level to rotate at the specific number of revolutions.

Meanwhile, the controller 300 detects the number of revolutions of the LED portion 200 and controls a light generation amount of the one or more LED elements 210 according to a variation of the number of revolutions of the LED portion 200. A revolution number detector 310 is provided on one side of the LED portion 200. The revolution number detector 310 employs a sensor S such as a gyro sensor, an acceleration sensor, or the like.

For example, the LED portion 200 includes one or more rotating plates 220 fixed to a rotation shaft 410. Whenever the number of revolutions of the LED portion 200 becomes a value which is obtained by dividing a turn-on frequency of the one or more LED elements 210 by the number of the rotating plates 220, the controller 300 controls emission of the one or more LED elements 210 to implement an operation pattern P selected by the signal transmitter 100. Furthermore, whenever the LED portion 200 rotates once to allow the selected operation pattern P to continue, the controller 300 checks an emission timing or an emission amount of the one or more LED elements 210.

When the rotating plate 220 is one, a specific operation pattern P may be designated with respect to each number corresponding to a turn-on frequency range of the LED elements 210 (e.g., from 50 to 150 Hz). When the LED portion 200 rotates at a specific number, the controller 300 controls the emission of the LED elements 210 to implement a designated operation pattern P.

Figure 10:
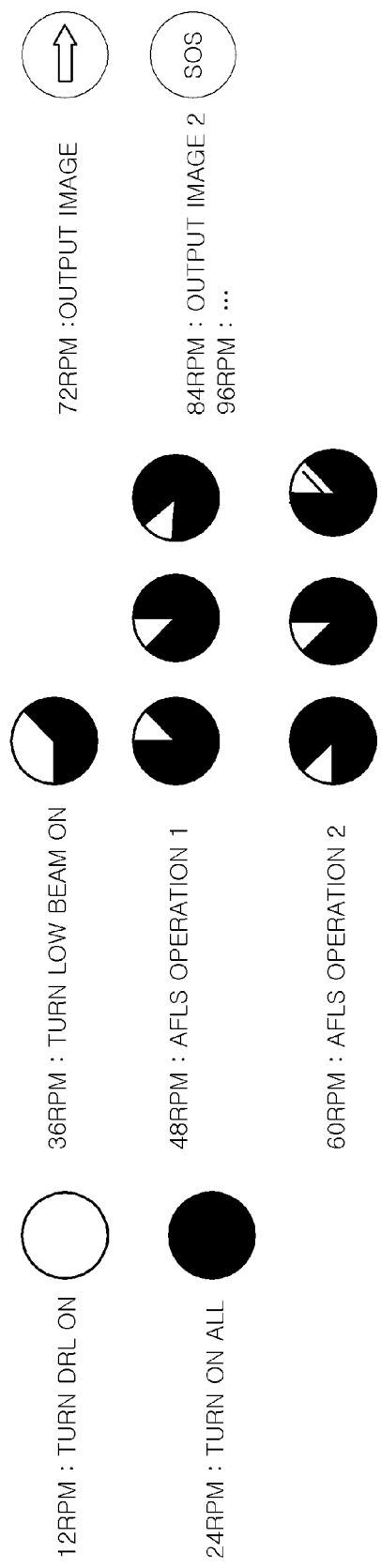
FIG. 10 is an exemplary diagram illustrating operation patterns which are selected according to the number of revolutions of a light emitting diode (LED) portion.

When the rotating plate 220 are three and a turn-on frequency range of the LED elements 210 ranges from 108 to 252 Hz, an operation pattern P may be designated as shown in FIG. 10. When the LED portion 200 rotates at 36 revolutions per minute (RPM), 48 RPM, 60 RPM, 72 RPM, 84 RPM, or the like, the controller 300 controls the emission of the LED elements 210 to implement a specific operation pattern P which is designated according to a corresponding number of revolutions in advance.

When the LED portion 200 rotates at 12 RPM or 24 RPM, a specific type of operation pattern P may be designated even though the operation pattern P does not correspond to a value which is obtained by dividing the turn-on frequency by the number of rotating plates 220. For example, a daytime running lamp (DRL) may be implemented.

Alternatively, when the number of revolutions of the LED portion 200 is increased, the controller 300 recognizes as code 1, and when the number of revolutions of the LED portion 200 is decreased, the controller 300 recognizes as code 0. Whenever a combination of code 1 and code 0 which are recognized during a unit time is varied, the controller 300 controls the emission of the one or more LED elements 210 to implement an operation pattern P which is selected by the signal transmitter 100. Furthermore, whenever the LED portion 200 rotates once to allow the selected operation pattern P to continue, the controller 300 checks an emission timing or an emission amount of the one or more LED elements 210.

Figure 5:
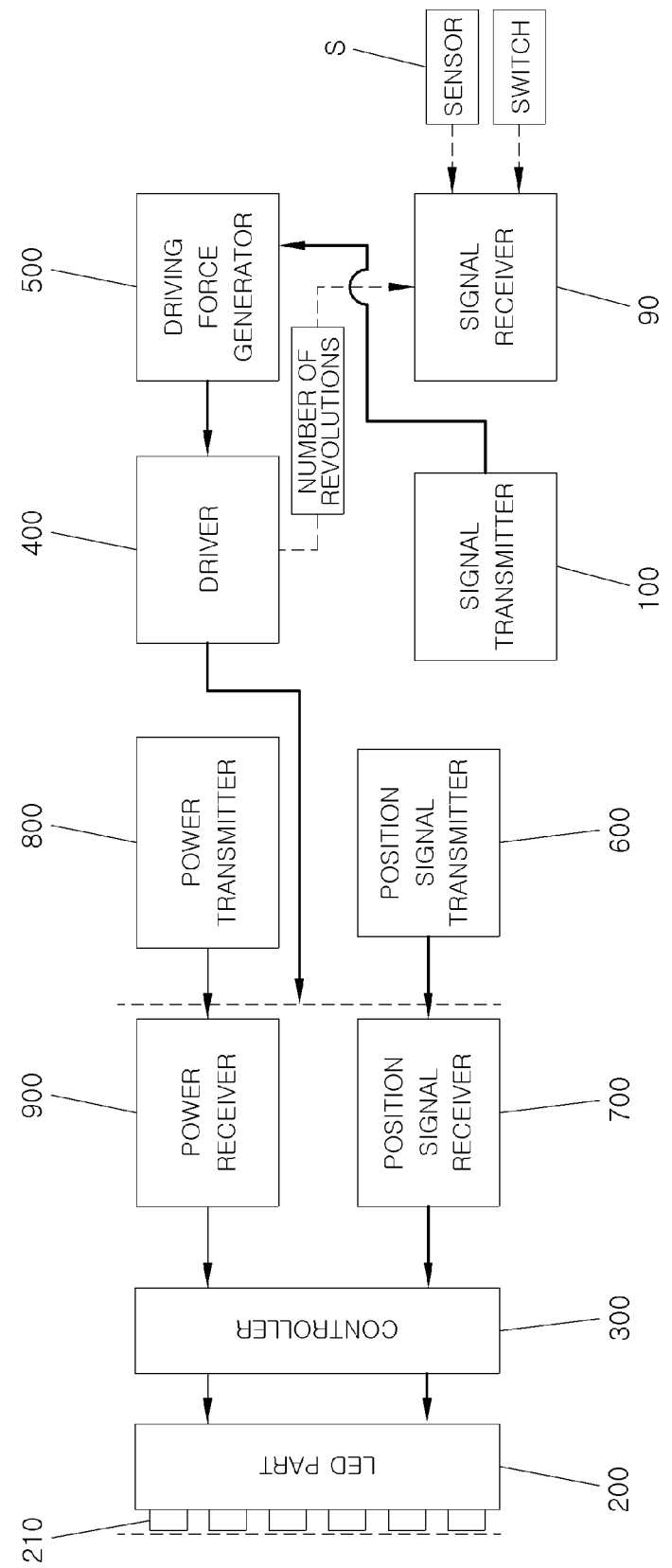
FIG. 5 and FIG. 6 are block diagrams illustrating a vehicle lamp with a rotating light source according to various exemplary embodiments of the present invention.
Figure 6:
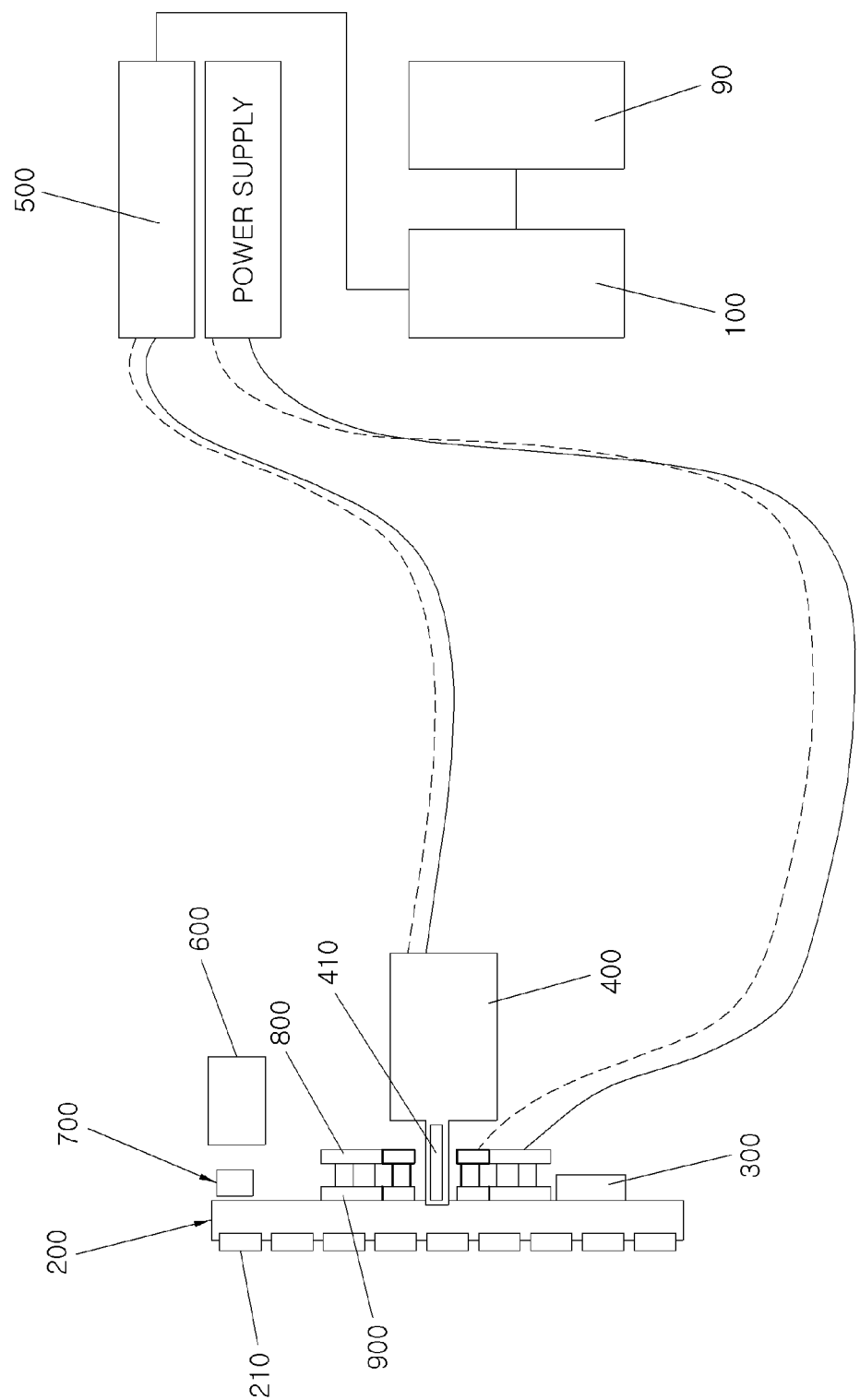

As shown in FIGS. 5, 6, and 9, a vehicle lamp with a rotating light source according to various exemplary embodiments of the present invention has the configuration of the vehicle lamp with a rotating light source according to the above-described various exemplary embodiments in which the revolution number detector 310 is excluded and a position signal transmitter 600 and a position signal receiver 700 are added.

The position signal transmitter 600 is mounted on one side of a driver 400. The position signal receiver 700 is provided in the LED portion 200 to detect the position signal transmitter 600. The position signal receiver 700 is formed of a coil or an optical sensor, and the position signal transmitter 600 is formed of a magnet or a light source. Therefore, when compared with a gyro sensor or an acceleration sensor, a rotation speed of the LED portion 200 may be measured more accurately.

As described above, a controller 300 detects the number of revolutions of the LED portion 200 and controls a light generation amount of one or more LED elements 210 according to a variation in the number of revolutions of the LED portion 200. Consequently, when compared with the above-described configuration of the vehicle lamp with a rotating light source according to the various exemplary embodiments of the present invention, the light generation amount of the one or more LED elements 210 may be controlled more accurately.

Figure 7:
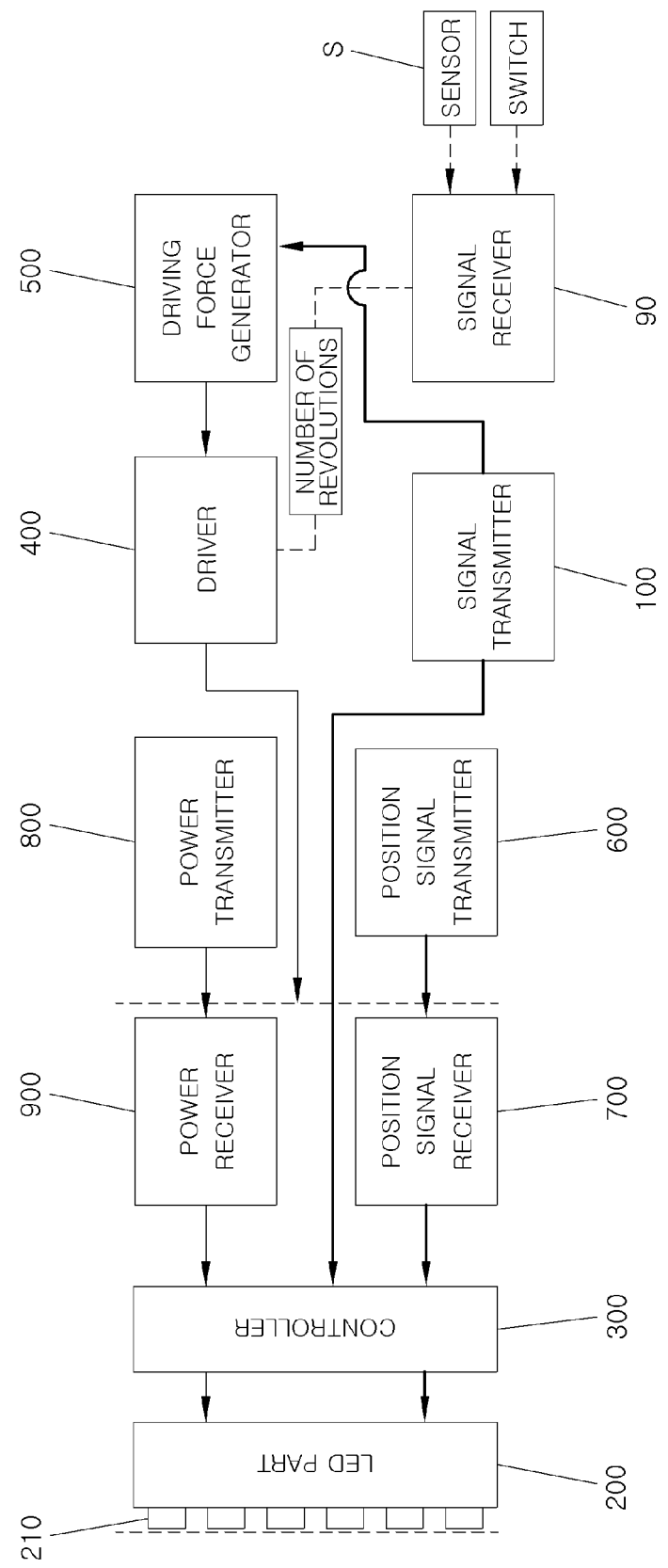
FIG. 7 and FIG. 8 are block diagrams illustrating a vehicle lamp with a rotating light source according to various exemplary embodiments of the present invention.
Figure 8:
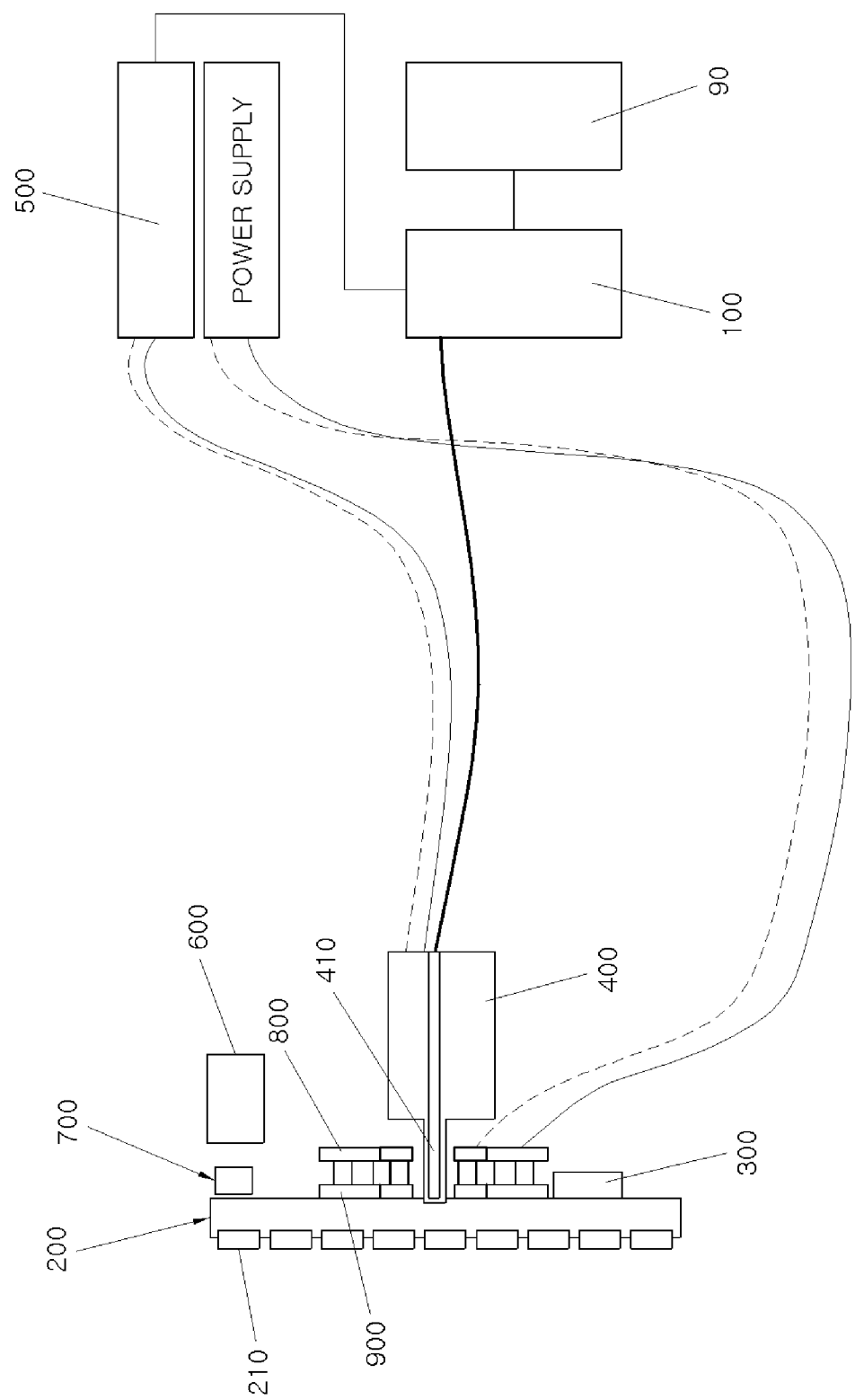

As shown in FIGS. 7 to 9, a vehicle lamp with a rotating light source according to various exemplary embodiments of the present invention is formed by combining the above-described vehicle lamp with a rotating light source according to the various exemplary embodiments with the above-described vehicle lamp with a rotating light source according to according to the various exemplary embodiments.

A controller 300 primarily selects an operation pattern P according to various signals received from a signal transmitter and controls emission of one or more LED elements 210 according to a measured cycle of one rotation, a rotation angle of an LED portion 200, or an attitude of a vehicle body. Furthermore, the controller 300 secondly controls the emission of the one or more LED elements 210 on the basis of a detection signal which is generated when the position signal transmitter 600 detects the position signal receiver 700.

When the detection signal begins to be received from the position signal transmitter 600, the controller 300 controls a light generation amount of the one or more LED elements 210 according to the detection signal received from the position signal transmitter 600 in preference to various signals which are directly received from the signal transmitter 100.

In the instant case, since selection of an operation pattern P according to the various signals received from the signal transmitter 100 is omitted, a load, power consumption, and heat generation which are generated in the controller 300 are reduced. When the vehicle is driving at a high speed, a front side environment of the vehicle is rapidly varied. Since the controller 300 is mounted on the LED portion 200 and thus the load of the controller 300 having a limited size and a limited processing capacity is reduced, when compared with a case in which a load of the controller 300 is generated to be large, a light pattern suitable for the front side environment of the vehicle is implemented at a higher speed.

Figure 11:
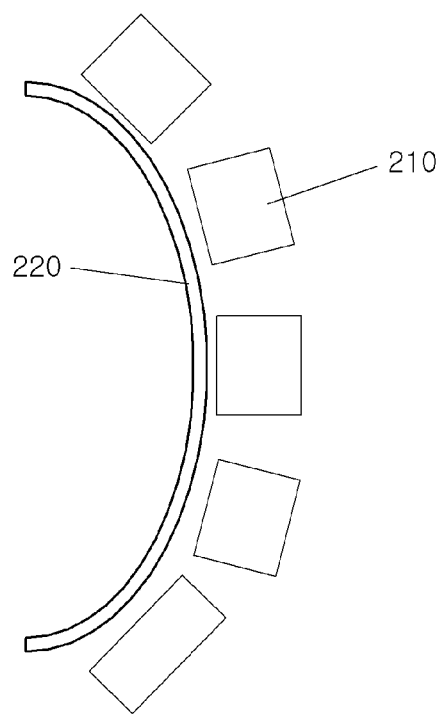
FIG. 11, FIG. 12 and FIG. 13 are exemplary diagrams illustrating an LED portion provided in the vehicle lamp with the rotating light source according to the various exemplary embodiments of the present invention shown in FIG. 1.
Figure 12:
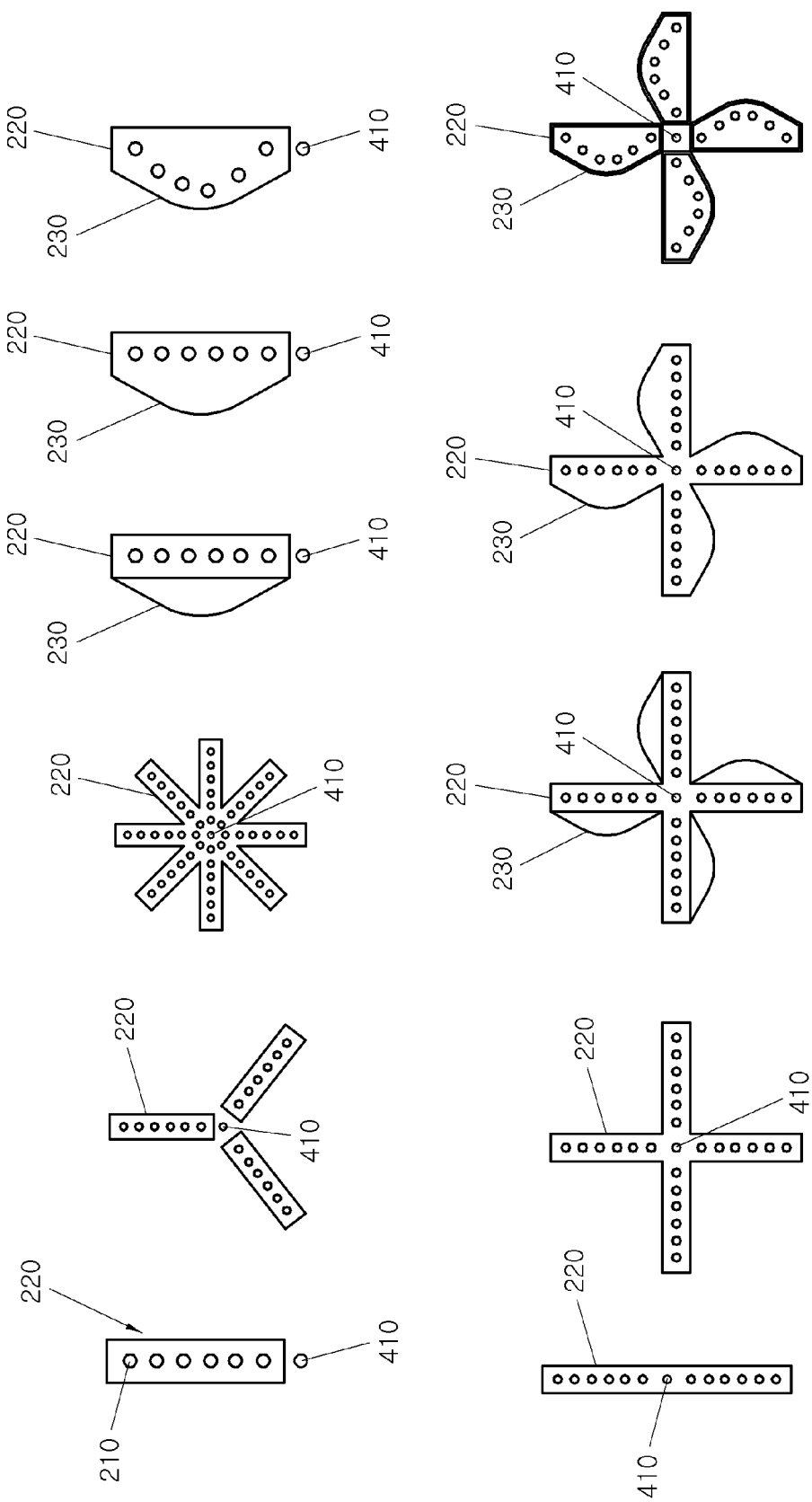
Figure 13:
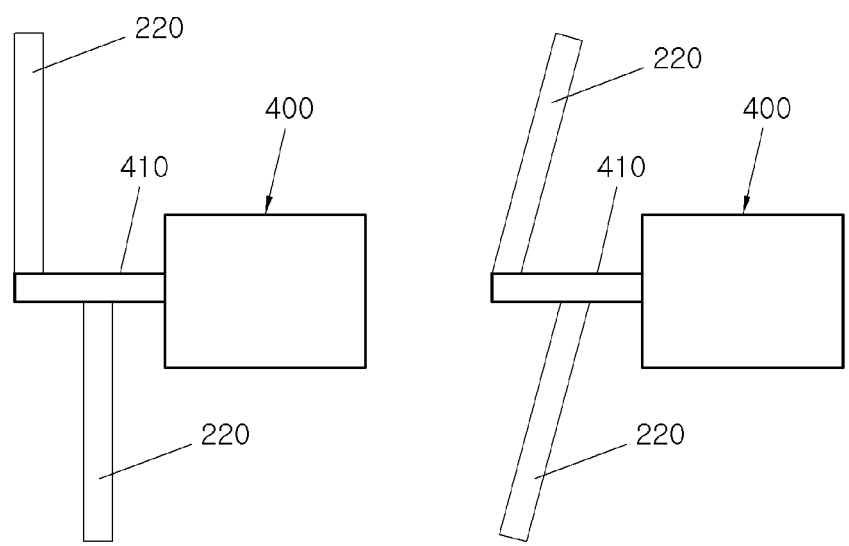
Figure 14:
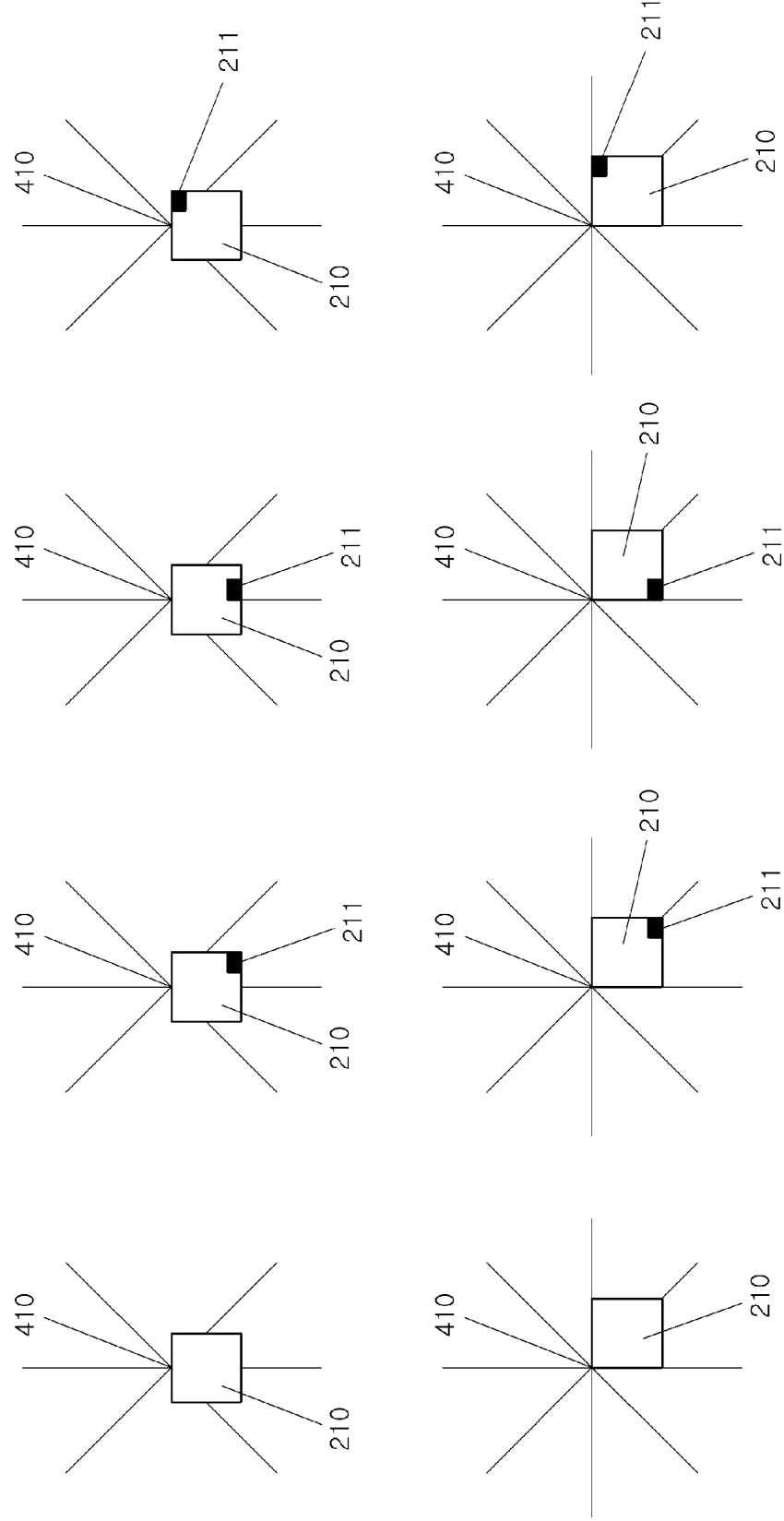
FIG. 14, FIG. 15, FIG. 16 and FIG. 17 are exemplary diagrams illustrating an arrangement of LED elements.

Meanwhile, as shown in FIGS. 11 to 13, the LED portion 200 mounted on the vehicle lamp with a rotating light source according to an exemplary embodiment of the present invention is fixed to the rotation shaft 410 which protrudes from the driver 400 to the front side of the vehicle. The LED portion 200 includes one or more rotating plates 220 having an angle range from 0 degrees to 180 degrees with respect to the rotation shaft 410 in a front side direction of the vehicle. The one or more rotating plate 220 may be curved to have curvatures according to an optical path design.

The one or more rotating plates 220 are mounted to have different distances from a rotating portion. The one or more rotating plates 220 are spaced at different distances apart from the rotating portion such that a stereoscopic light source may be implemented. The one or more LED elements 210 are rotated to emit light such that surface emission generated at the front side of the vehicle may form a stereoscopic image.

For example, the one or more rotating plates 220 are manufactured in a rectangular shape, and an end portion of a side of each of the one or more rotating plates 220 is bonded to the rotation shaft 410. The one or more LED elements 210 are mounted on each of the one or more rotating plates 220 in a direction from the rotation shaft 410 toward the other end portion of each of the one or more rotating plates 220. The one or more LED elements 210 are mounted on each of the rotating plates 220 at different specific intervals.

Since the intervals between the LED elements 210 are different on each of the rotating plates 220, when one or more rotating plates 220 rotates, light emitted from each of the LED elements 210 has an overlapping area. Consequently, surface emission which is light in a form of a surface having no boundary line is irradiated to the front side of the vehicle.

Alternatively, an arc-shaped wing plate 230 may be provided on a side opposite to the rotation direction of the rotation shaft 410 among surfaces of the rotating plate 220. The wing plate 230 is provided such that effects of heat dissipation and moisture control of the rotating plate 220 are improved. Furthermore, one or more LED elements 210 may be mounted along a curvature of the wing plate 230. The LED elements 210 are mounted along the curvature of the wing plate 230 such that an interval between the LED elements 210 may be increased and a heat dissipation area may be maximized.

As shown in FIGS. 14 to 17, the LED element 210 mounted on the vehicle lamp with a rotating light source according to an exemplary embodiment of the present invention is mounted on the rotating plate 220. In the instant case, it is assumed that the rotating plate 220 has a disc shape and a center portion of the rotating plate 220 is connected to an end portion of the rotation shaft 410. The LED element 210 mounted on the LED portion 200 has a quadrangular shape.

One or more LED elements 210 may generate any one among red, green, blue, or yellow colors. To allow light to be emitted from a center portion of the LED portion 200 when the LED portion 200 rotates, a vertex or a side of any one among the one or more LED elements 210 is mounted on the rotating plate 220 to overlap the rotation shaft 410. In the instant case, a junction 211 of the LED element 210, of which a vertex or a side overlaps the rotation shaft 410, does not overlap the rotation shaft 410.

Figure 15:
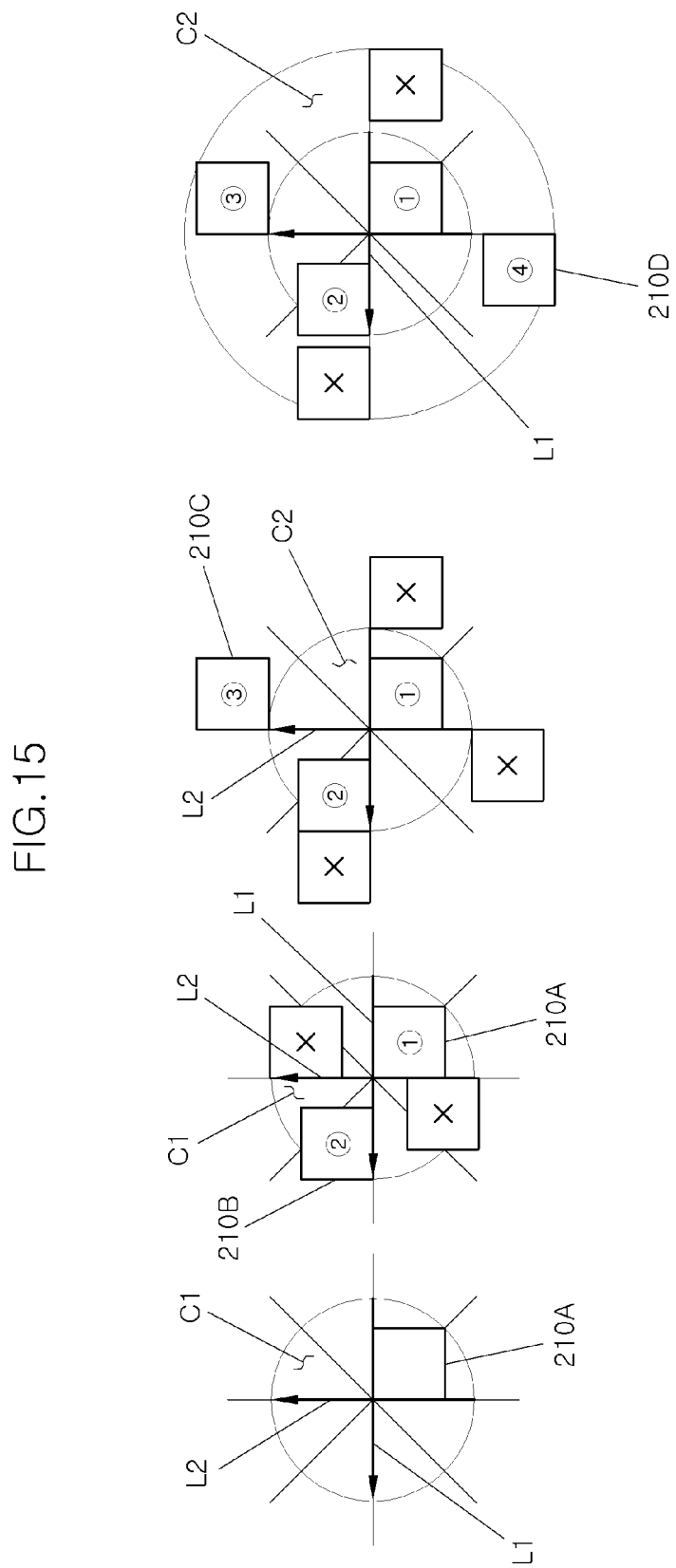

As shown in FIG. 15, any one vertex of a first LED element 210A is mounted to overlap the rotation shaft 410. One side of a second LED element 210B is mounted to be located on a first imaginary line L1 which passes the rotation shaft 410 and one side of the first LED element 210A. A center portion of the second LED element 210B is located in a first imaginary circle C1, and simultaneously, a vertex thereof is located on a circumference of the first imaginary circle C1. The first imaginary circle C1 is centering on the rotation shaft 410 and has a diameter which is equal to a diagonal length of the first LED element 210A. When a portion in which the first LED element 210A is located is referred to as a fourth quadrant of the first imaginary circle C1, the second LED element 210B is located in a second quadrant thereof One side of a third LED element 210C is mounted to be located on a second imaginary line L2. The second imaginary line L2 is perpendicular to the first imaginary line L1 and is a line which passes the rotation shaft 410 and one side of the first LED element 210A. The third LED element 210C is located outside the first imaginary circle C1, and simultaneously, a vertex of the third LED element 210C is located on the circumference of the first imaginary circle C1. When the portion in which the first LED element 210A is located is referred to as the fourth quadrant of the first imaginary circle C1, the third LED element 210C is located in a first quadrant thereof.

One side of a fourth LED element 210D is mounted to be located on the second imaginary line L2. A center portion of the fourth LED element 210D is located in a second imaginary circle C2, and simultaneously, a vertex thereof is located on a circumference of the second imaginary circle C2. The second imaginary circle C2 is centering on the rotation shaft 410 and has a diameter which is equal to or less than two times the diagonal length of the first LED element 210A. When the portion in which the first LED element 210A is located is referred to as the fourth quadrant of the first imaginary circle C1, the fourth LED element 210D is located in a third quadrant thereof.

As described above, the first LED element 210A to the fourth LED element 210D are mounted such that a largest separation distance between the LED elements 210 may be formed and heat dissipation performance is improved.

Figure 16:
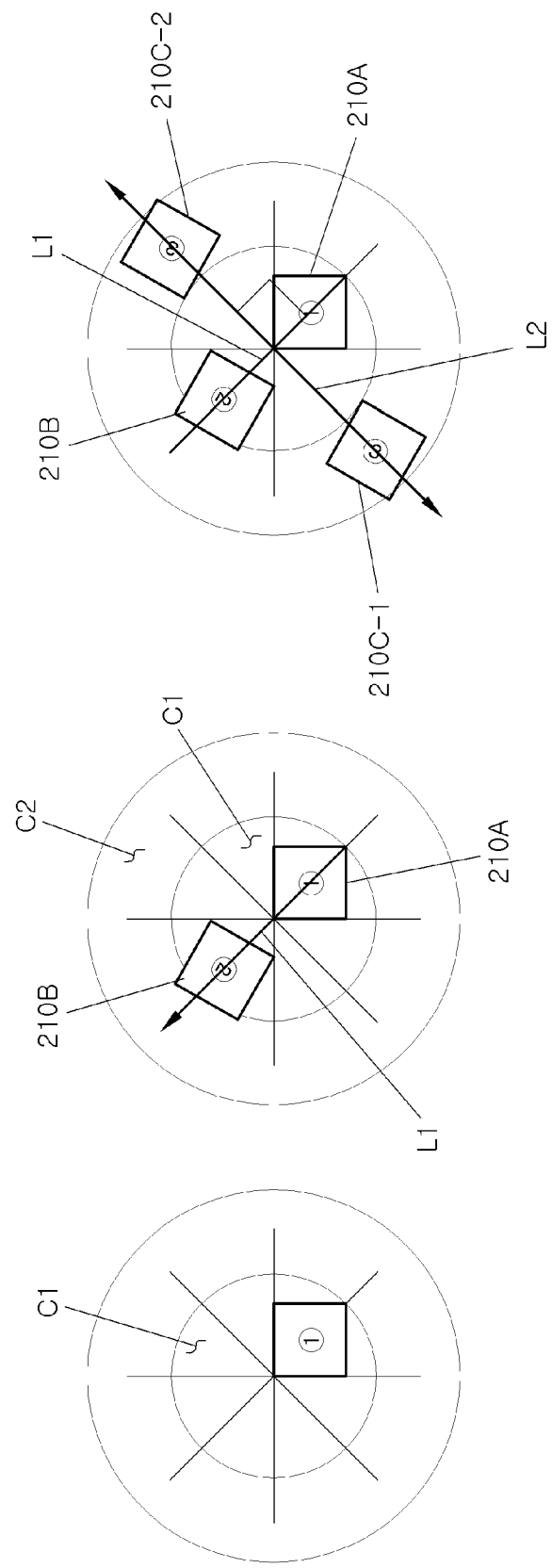

As shown in FIG. 16, any one vertex of the first LED element 210A is mounted to overlap the rotation shaft 410. The center portion of the second LED element 210B is mounted to be located on the first imaginary line L1. The center portion of the second LED element 210B is mounted in the first imaginary line C1. The first imaginary circle C1 is centering on the rotation shaft 410 and has a diameter which is equal to the diagonal length of the first LED element 210A.

Centers of third LED elements 210C-1 and 210C-2 are mounted to be located on the second imaginary line L2. The second imaginary line L2 is perpendicular to the first imaginary line L1 and is a line which passes the rotation shaft 410. The third LED elements 210C-1 and 210C-2 are located in the first imaginary circle C1, and simultaneously, are located outside the first imaginary circle C1. The second imaginary circle C2 is centering on the rotation shaft 410 and has a diameter which is equal to or less than two times the diagonal length of the first LED element 210A.

The third LED elements 210C-1 and 210C-2 are divided into a third-first LED element 210C-1 and a third-second LED element 210C-2. The third-first LED element 210C-1 and the third-second LED element 210C-2 are symmetric about the rotation shaft 410.

Figure 17:
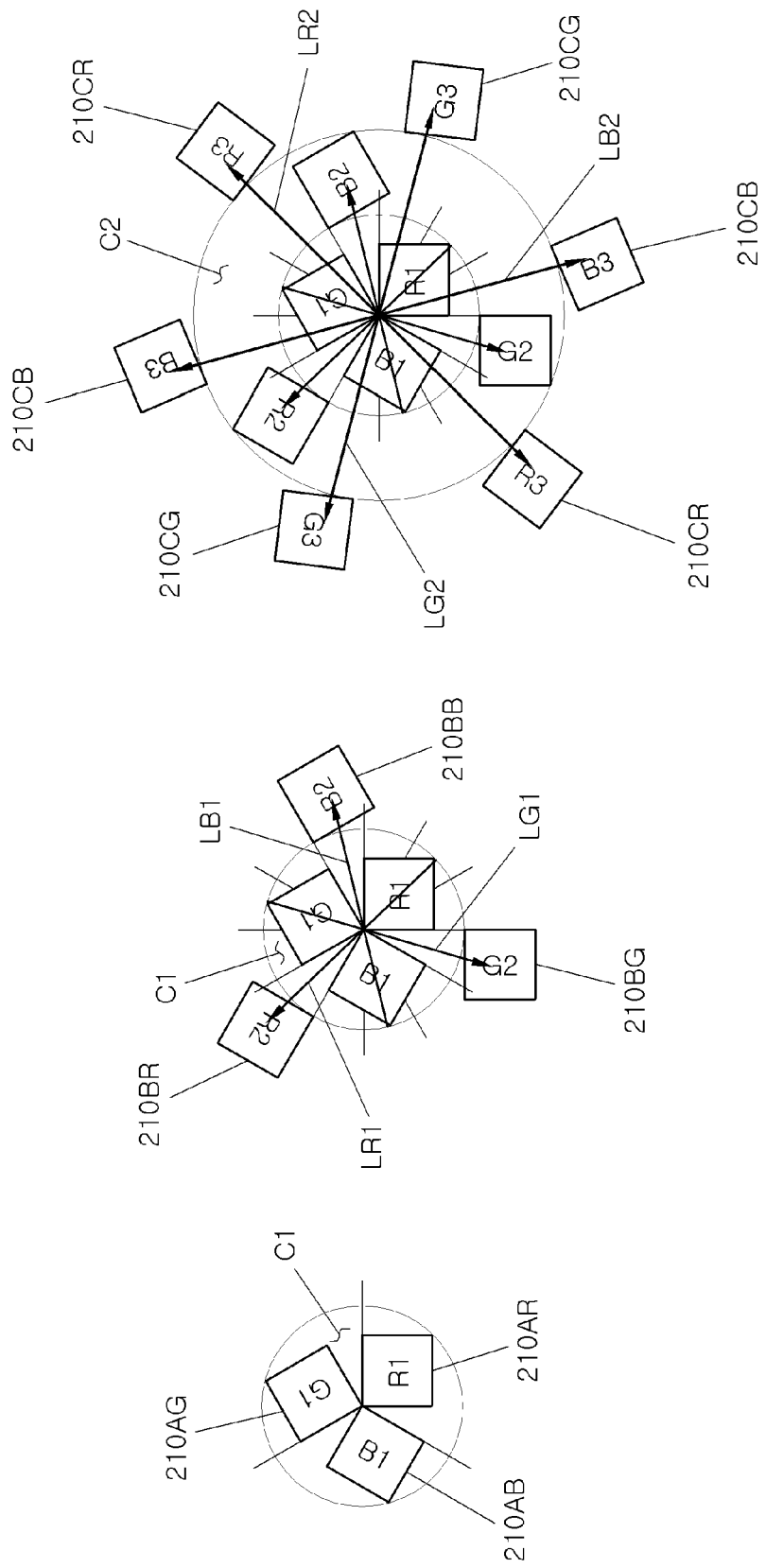

As shown in FIG. 17, any one vertex of each of a first green LED element 210AG, a first red LED element 210AR, and a first blue LED element 210AB are mounted to overlap the rotation shaft 410, and the first green LED element 210AG, the first red LED element 210AR, and the first blue LED element 210AB have the same angle about the rotation shaft 410.

A center portion of a second green LED element 210BG is mounted to be located on a first imaginary green line LG1. The first imaginary green line LG1 is a line extending from the rotation shaft 410 toward a center portion of the first green LED element 210AG. The second green LED element 210BG is located outside the first imaginary circle C1, and simultaneously, located in the second imaginary circle C2. The first imaginary circle C1 is centering on the rotation shaft 410 and has a diameter which is equal to a diagonal length of the first green LED element 210AG. The second imaginary circle C2 is centering on the rotation shaft 410 and has a diameter which is equal to or less than two times the diagonal length of the first green LED element 210AG.

A center portion of a second red LED element 210BR is mounted to be located on a first imaginary red line LR1. The first imaginary red line LR1 is a line extending from the rotation shaft 410 toward a center portion of the first red LED element 210AR. The second red LED element 210BR is located outside the first imaginary circle C1, and simultaneously, located in the second imaginary circle C2.

A center portion of a second blue LED element 210BB is mounted to be located on a first imaginary blue line LB1. The first imaginary blue line LB1 is a line extending from the rotation shaft 410 toward a center portion of the first blue LED element 210AB. The center portion of the second blue LED element 210BB is located outside the first imaginary circle C1, and simultaneously, located in the second imaginary circle C2.

A third-first green LED element and a third-second green LED element 210CG are symmetrically mounted about the rotation shaft 410. The third-first green LED element and the third-second green LED element 210CG are located outside the second imaginary circle C2. Centers of the third-first green LED element and the third-second green LED element 210CG are located on a second imaginary green line LG2. The second imaginary green line LG2 is perpendicular to the first imaginary green line LG1 and is a line which passes the rotation shaft 410.

A third-first red LED element and a third-second red LED element 210CR are symmetrically mounted about the rotation shaft 410. The third-first red LED element and the third-second red LED element 210CR are located outside the second imaginary circle C2. Centers of the third-first red LED element and the third-second red LED element 210CR are located on a second imaginary green line LR2. The second imaginary red line LR2 is perpendicular to the first imaginary red line LR1 and is a line which passes the rotation shaft 410.

A third-first blue LED element and a third-second blue LED element 210CB are symmetrically mounted about the rotation shaft 410. The third-first blue LED element and the third-second blue LED element 210CB are located outside the second imaginary circle C2. Centers of the third-first blue LED element and the third-second blue LED element 210CB are located on a second imaginary blue line LB2. The second imaginary blue line LB2 is perpendicular to the first imaginary blue line LB1 and is a line which passes the rotation shaft 410.

As described above, the green LED elements, the blue LED elements, and the red LED elements are mounted such that a separation distance between the LED elements 210 may be maximized, and heat dissipation performance may be increased, rotation radii of the LED elements 210 emitting green, blue, and red colors overlaps such that green light, blue light, and red light may be mixed. Light in which various colors are mixed may be irradiated to the front side of the vehicle.

Meanwhile, the vehicle lamp with a rotating light source according to an exemplary embodiment of the present invention continuously controls ON, OFF, and a light generation amount of the one or more LED elements 210 to allow an operation pattern P to be implemented. The operation pattern P includes a turn-on position or a turn-off position according to a rotation angle and the number of revolutions of the rotating plate 220. When the turn-on position is included in the operation pattern P, the LED elements 210 are turned on at the turn-on position. When the LED elements 210 are not at the turn-on position, the LED elements 210 are turned off. When the turn-off position is included in the operation pattern P, the LED elements 210 are turned off at the turn-off position. When the LED elements 210 are not at the turn-off position, the LED elements 210 are turned on.

Figure 18:
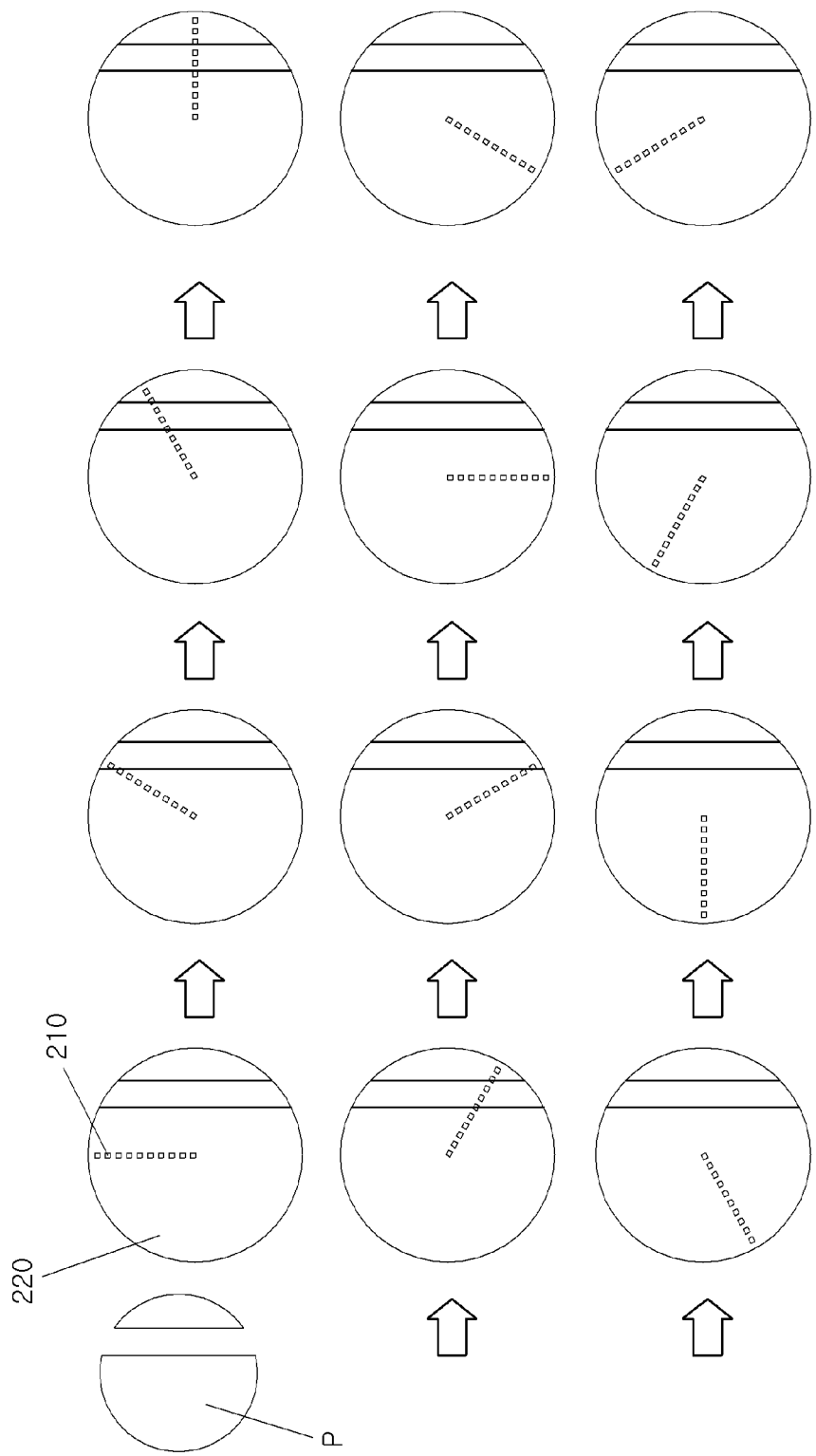
FIG. 18, FIG. 19 and FIG. 20 are exemplary diagrams illustrating a dimming time of an LED element.
Figure 19:
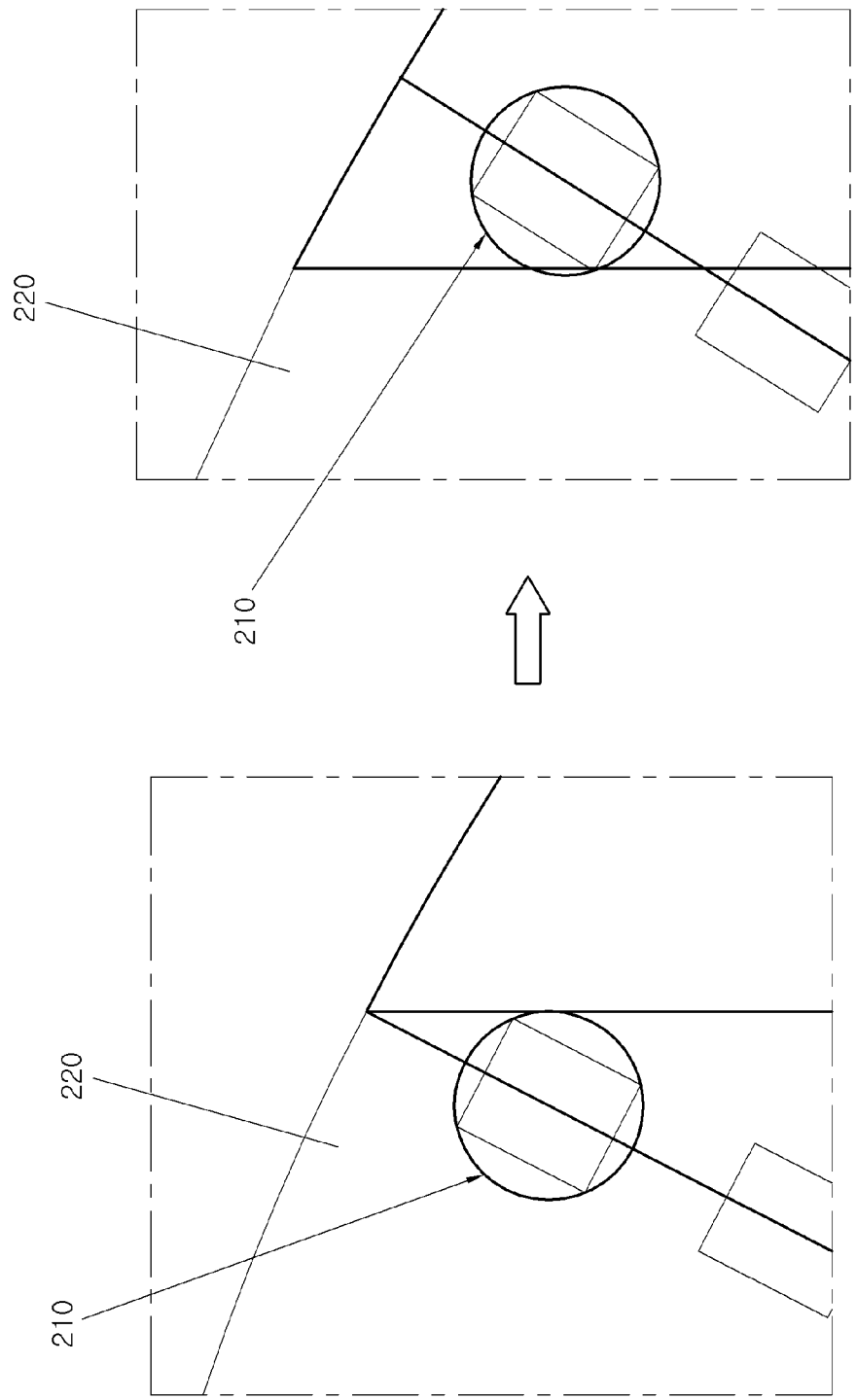
Figure 20:
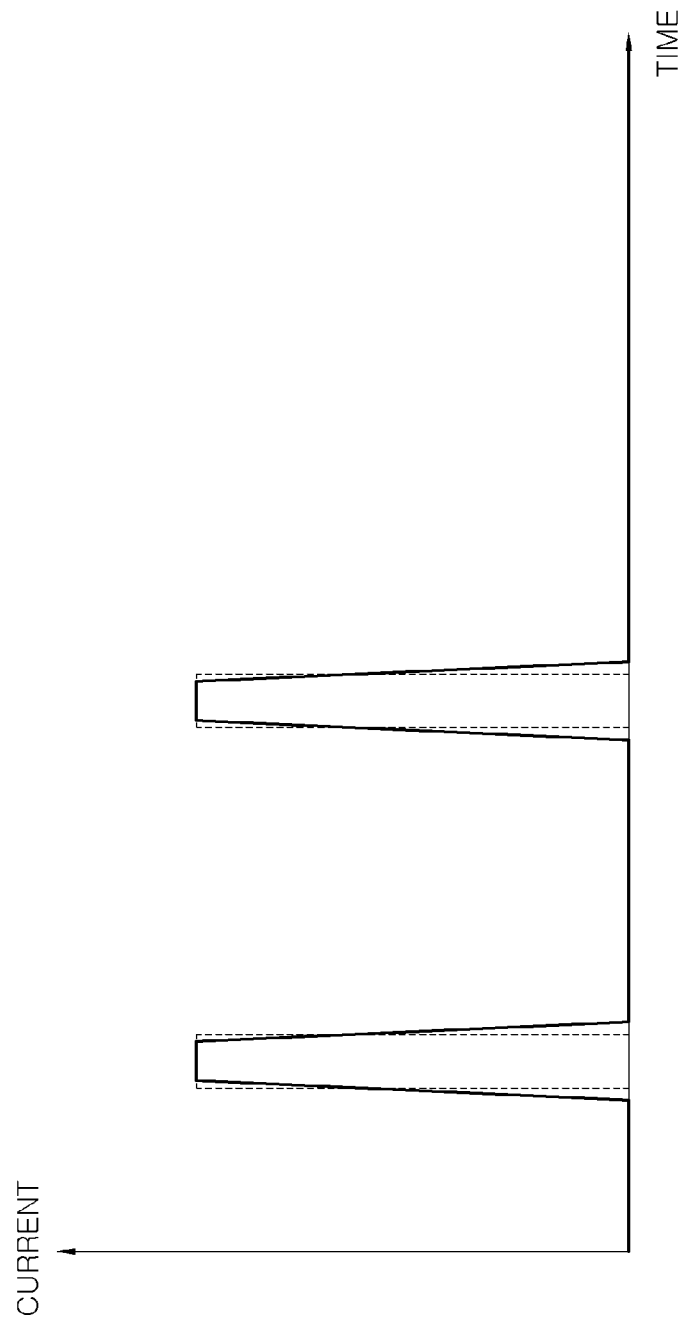

As shown in FIGS. 18 to 20, when the LED elements 210 included in the rotating plate 220 enter the turn-off position, the LED elements 210 are turned off only when light emitting surfaces of the LED elements 210 are completely moved to the turn-off position. Accordingly, there is a probability that discontinuous light such as a saw blade is generated at a boundary between the turn-off position and the turn-on position.

In view of the above description, in an exemplary embodiment of the present invention, to allow continuous light to be generated at the boundary between the turn-off position and the turn-on position, when the LED elements 210 are moved from the turn-on position to the turn-off position or vice versa, an operation pattern P includes a dimming time in which light generation of the LED elements 210 gradually decreases or increases.

For example, to implement the operation pattern P, the controller 300 flickers some of the one or more LED elements 210 provided in the LED portion 200 according to a rotation angle of the LED portion 200. A dimming time is varied according to a rotation speed of the LED portion 200 to allow the flickering LED element 210 among the one or more LED elements 210 to be turned off or on slowly.

As a size of the flickering LED element 210 is increased, the dimming time increases. As a position of the flickering LED element 210 becomes close to the rotation shaft 410 protruding from the driver 400 toward the front side of the vehicle, the dimming time increases. As the rotation speed of the LED portion 200 becomes slower, the dimming time increases.

Figure 22:
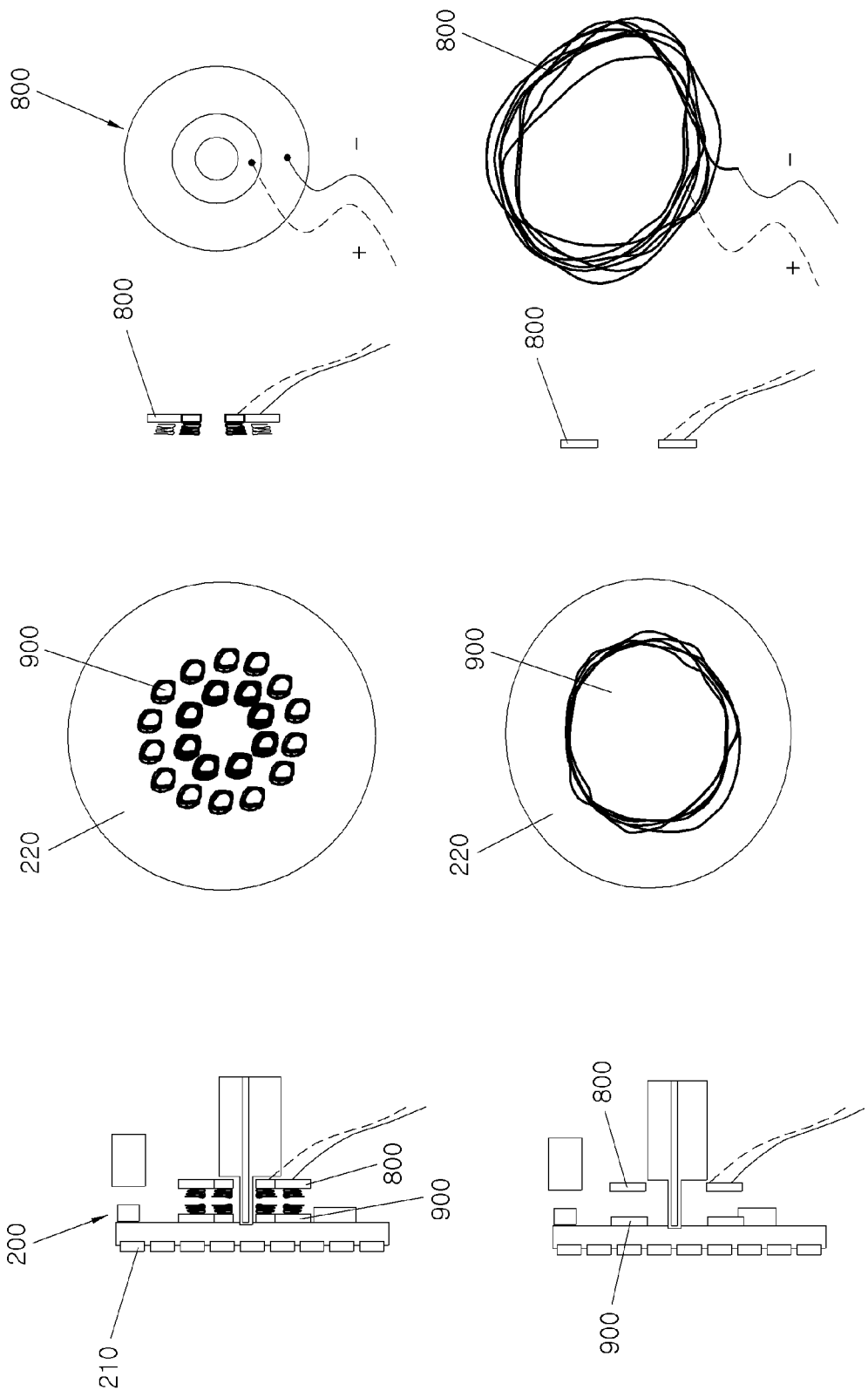
Figure 23:
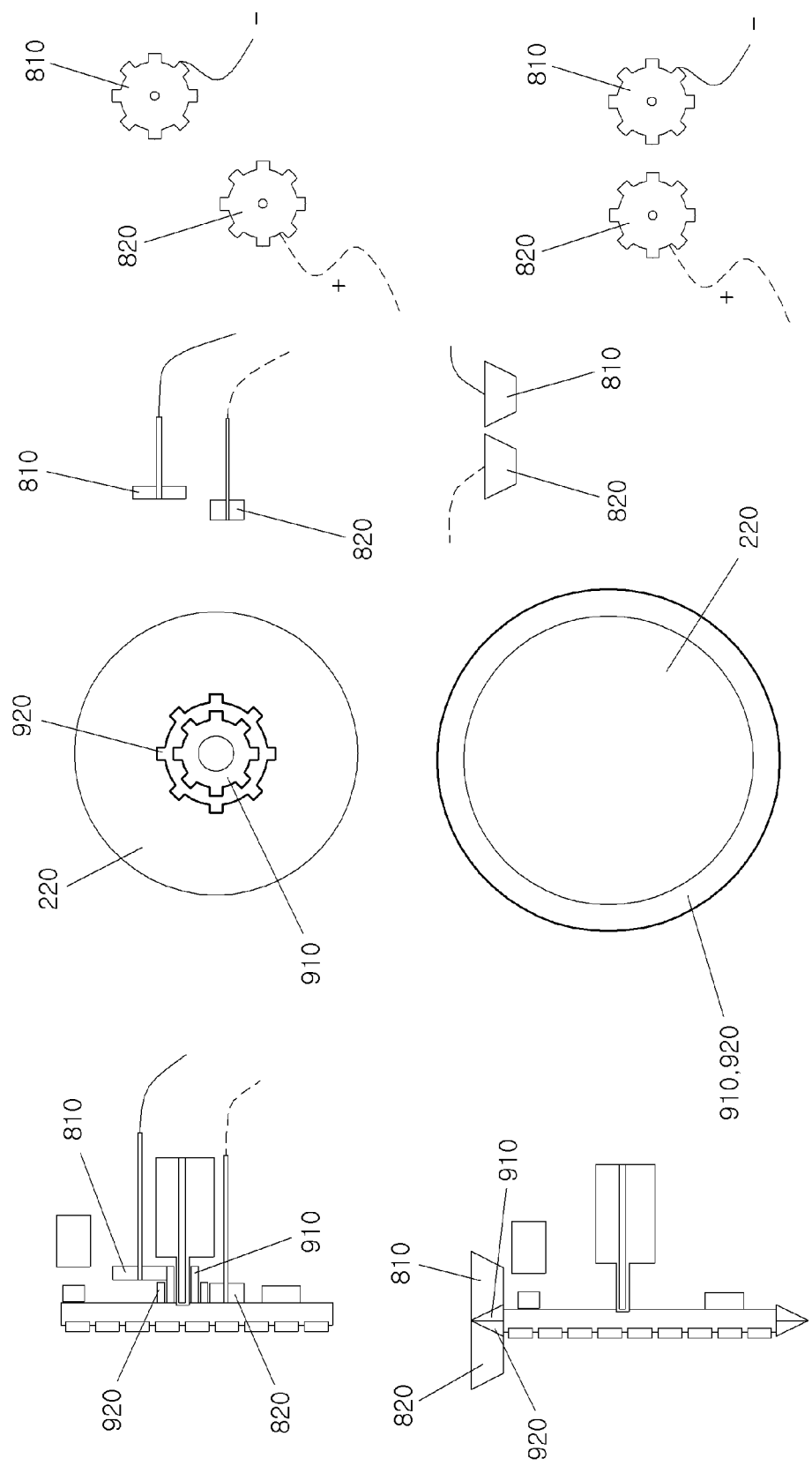

As shown in FIGS. 21 to 23, the power transmitter 800 is mounted behind the LED portion 200 and the power receiver 900 is mounted on a rear surface of the LED portion 200. The power transmitter 800 receives external power, and the power receiver 900 supplies power to the LED elements 210.

For example, the power receiver 900 may be formed of a brush wire behind the LED portion 200, and the power transmitter 800 may be formed of a slip ring on the rear surface of the LED portion 200 to be in contact with the brush wire. As shown in FIG. 21, the slip ring is formed in a form of a disc or a tube. The brush wire is formed parallel or perpendicular to the rotation shaft 410 according to the form of the slip ring.

Alternatively, as shown in FIG. 22, the power receiver 900 is formed of an electromagnet which is mounted behind the LED portion 200, and the power transmitter 800 is formed of a coil on the rear surface of the LED portion 200 to face the electromagnet.

Also alternatively, as shown in FIG. 23, the power receiver 900 is formed of a positive receiving gear 910 and a negative receiving gear 920 which are mounted behind or above the LED portion 200, and the power transmitter 800 may be formed of a positive transmitting gear 810 mounted on the rear surface or a side surface of the LED portion 200 to be engaged with the positive receiving gear 910 and a negative transmitting gear 820 mounted on the rear surface or the side surface of the LED portion 200 to be engaged with the negative receiving gear 920.

In accordance with the vehicle lamp with a rotating light source according to an exemplary embodiment of the present invention, which is formed as described above, the number of LED elements 210 is reduced such that heat resistance performance of the PCB and the LED elements 210 may be improved.

Furthermore, since the LED elements 210 emit light while being rotated, an effect is obtained in that an afterimage is generated along rotation paths of the LED elements 210 and an infinite number of LED elements 210 emit light simultaneously. Ultimately, surface emission without a boundary line may be generated.

Furthermore, one or more rotating plates 220 are provided in the LED portion 200, and the one or more rotating plates 220 have different distances from the driver 400 such that it is possible to implement a stereoscopic light source.

Furthermore, as the LED portion 200 is rotated, light generated from the LED elements 210 is configured as a soft line light source, minimizing generation of a dark portion on a light irradiation surface toward the front side of the vehicle.

Furthermore, a soft surface light source is generated using a phase difference between the LED elements 210, minimizing the generation of the dark portion on the light irradiation surface toward the front side of the vehicle.

Furthermore, a stereoscopic light source is generated using the phase difference between the LED elements 210 such that it is possible to implement various light images.

Furthermore, the LED elements 210 emitting green, blue, and red colors simultaneously emit light such that it is possible to implement various light images.

Furthermore, only LED elements 210 emitting a red color emit light, or LED elements 210 emitting green and red colors emit light simultaneously such that the LED elements 210 is configured as a brake light or a turn signal light.

Furthermore, color temperatures of one or more LED elements 210 mounted on the LED portion 200 are made to be different such that it is possible to irradiate light having various color temperatures to the front side of the vehicle.

Furthermore, a large area in front of the vehicle may be irradiated with light with a relatively small number of LED elements 210 such that a production cost and a voltage being used are reduced and fuel efficiency of the vehicle is improved.

When the vehicle lamp with a rotating light source according to an exemplary embodiment of the present invention is applied to a headlamp, an aspherical or spherical optical system may be located on a front surface of the LED portion 200, and a shield implementing a low beam during operation may be located between the LED portion 200 and the aspherical or spherical optical system. Alternatively, two or more optical systems may be located on the front surface of the LED portion 200. In the instant case, light emission of one or more LED elements 210 may be controlled to not allow light to reach a specific optical system.

A reflector may be located on the front surface of the LED portion 200 instead of an optical system. In the instant case, a shield is located on one side of the LED portion 200 and the reflector is located above the LED portion 200 and the shield. Alternatively, two or more reflectors may be located on the front surface of the LED portion 200. In the instant case, light emission of one or more LED elements 210 may be controlled to not allow light to reach a specific reflector.

A functional lamp to which the vehicle lamp with a rotating light source according to an exemplary embodiment of the present invention is applied may be embedded in a front grille of a vehicle. Light of a specific image may be generated through an opening of the front grille. When a wireless key is manipulated, an icon or a text expressing welcome may be expressed as a stereoscopic optical image. The LED portion 200 may be located in a cooling fan which is located inside the front grille of the vehicle. In the instant case, since it is unnecessary to add a separate device, it is easy to apply to the existing vehicle.

Although the LED elements 210 have been referred to as being mounted regularly, one or more LED elements 210 may be irregularly mounted in the LED portion 200. In the instant case, to allow the operation pattern P to be implemented, ON, OFF, and a light generation amount of each LED element 210 may be controlled according to a rotation speed and a rotation angle of each LED element 210.

Furthermore, in the above description, the vehicle lamp with a rotating light source according to an exemplary embodiment of the present invention has been exemplified as being applied to the headlamp. However, the vehicle lamp with a rotating light source according to an exemplary embodiment of the present invention may be applied to a rear combination lamp (RCL). When one or more LED elements 210 may compositely express green and red colors, it is not necessary to distinguish a turn signal light from a brake light. When one or more rotating plates 220 are fixed to the rotation shaft 410 to have a phase difference, it is possible to generate a stereoscopic optical image (characters, icons, or the like) in the RCL.

Alternatively, three rotating plates 220 of a rectangular shape may be mounted at the same angle about the rotation shaft 410, a green LED element 210 may be mounted on one rotating plate 220, a blue LED element 210 may be mounted on another rotating plate 220, and a red LED element 210 may be mounted on the remaining rotating plate 220. In the instant case, light of various colors may be irradiated to the front side of the vehicle by combining green light, blue light, and red light.

Furthermore, one or more PCBs which are electrically connected to the LED elements 210 may be mounted for each rotating plate 220. When one or more PCBs are mounted, one PCB is connected to a green LED element, another PCB is connected to a blue LED element, and the remaining PCB is connected to a red LED element. Thus, the LED elements 210 may be controlled for each emission color.

Figure 24:
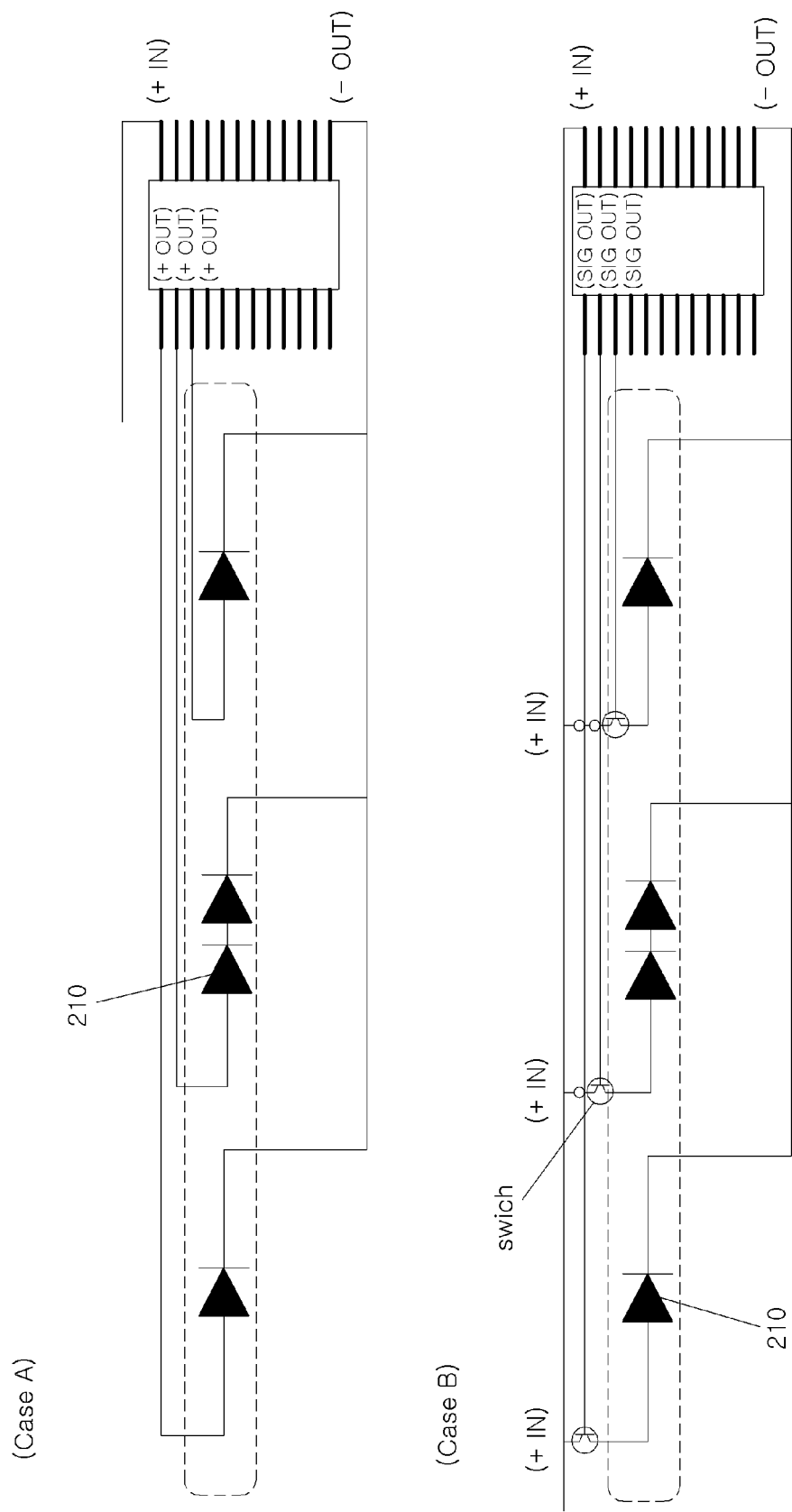
FIG. 24 is an exemplary diagram illustrating a printed circuit board (PCB).

Furthermore, as shown in Case A of FIG. 24, the PCB may be formed to allow the LED elements 210 to selectively emit light according to ON/OFF of a power input from the outside. As shown in Case B of FIG. 24, a signal detecting switch may be provided on the PCB to apply power to the LED elements 210, although the power is continuously supplied from the outside, only when a signal is received from the controller 30. The signal detecting switch may be directly connected to the position signal receiver 700.

Figure 25:
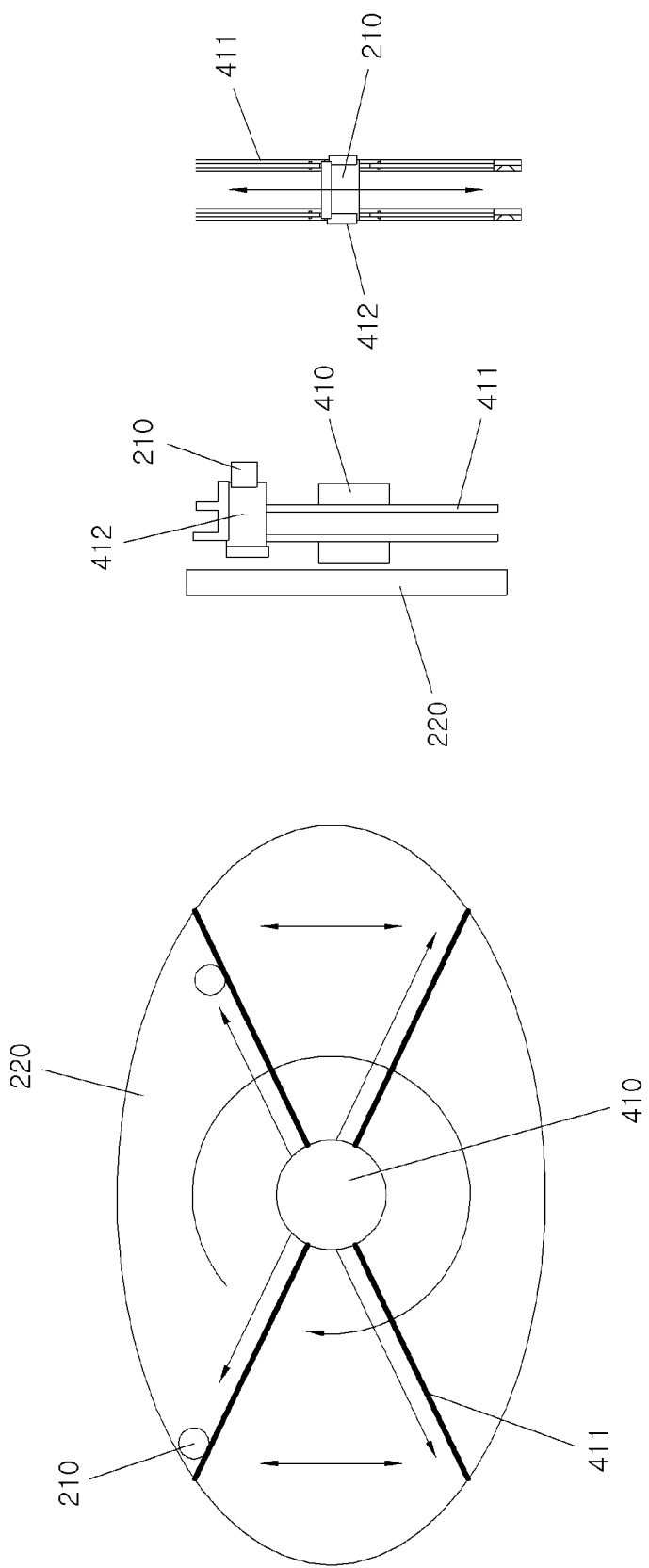
FIG. 25 is an exemplary diagram illustrating a vehicle lamp according to various exemplary embodiments of the present invention.

Alternatively, as shown in FIG. 25, the LED elements 210 may be linearly moved. A guide 411, which extends from one end portion of the rotating plate 220 connected to the rotation shaft 410 to the other end portion thereof, may be provided on the rotating plate 220, the LED elements 210 may be movably mounted on the guide 411, and a driver 412 may move the LED elements 210 in a response to a signal from the controller 300. In the instant case, even when only a single LED element 210 is mounted on the guide 411, it is possible to generate an effect due to an afterimage effect in that one or more LED elements 210 are mounted along the guide 411.

In accordance with a vehicle lamp with a rotating light source according to an exemplary embodiment of the present invention, which is formed as described above, the number of LED elements is reduced such that heat resistance performance of the PCB and the LED elements may be improved.

Furthermore, since the LED elements emit light while being rotated, an effect is obtained in that an afterimage is generated along rotation paths of the LED elements and an infinite number of LED elements emit light simultaneously. Ultimately, surface emission without a boundary line may be generated.

Furthermore, one or more rotating plates are provided in an LED portion, and the one or more rotating plates have different distances from a driver such that it is possible to implement a stereoscopic light source.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the claims appended hereto and their equivalents.

What is claimed is:

1. A vehicle lamp apparatus with a rotating light source, the vehicle lamp apparatus comprising:
   a signal receiver which is connected to one or more sensors mounted in a vehicle and receives a signal from the one or more sensors;
   a light emitting diode (LED) portion having one or more LED elements configured to emit light toward an outside of the vehicle;
   a controller connected to the one or more LED elements and configured to control a light generation amount of the one or more LED elements;
   a signal transmitter which is connected to the signal receiver, receives the signal from the signal receiver and transmits the received signal to the controller; and
   a driver coupled to the LED portion and configured to rotate the LED portion,
   wherein the controller is configured to control the light generation amount of the one or more LED elements in a response to the received signal,
   wherein a revolution number detector is provided on one side of the LED portion to detect a number of revolutions of the LED portion, and
   wherein the controller is configured to control the light generation amount of the one or more LED elements according to a variation of the number of revolutions of the LED portion.

2. The vehicle lamp apparatus of claim 1, wherein
   the controller is disposed on a rear surface of the LED portion;
   the LED portion is fixed to a rotation shaft which protrudes from the driver toward the outside of the vehicle;
   the signal transmitter is configured to transmit the signal to the controller through the rotation shaft;
   the signal includes an angle with respect to a precedent vehicle and an outside image of the vehicle;
   the signal transmitter is configured to transmit a lamp auto switch operation signal, a high beam operation signal, and a number of revolutions of the driver in addition to the signal; and
   the controller is configured to select an operation pattern among one or more stored operation patterns in a response to the received signal received from the signal transmitter.

3. The vehicle lamp apparatus of claim 2, wherein, when a lamp ON signal is applied, the controller is configured to control a rotation angle of the LED portion to become a reference state.

4. The vehicle lamp apparatus of claim 3, wherein the controller is configured to determine a time or the number of revolutions of the driver, which is controlled to make the rotation angle of the LED portion being the reference state, and to control light generation of the one or more LED elements and an operation of the driver to implement the selected operation pattern by setting the determined time or the determined number of revolutions as one cycle.

5. The vehicle lamp apparatus of claim 3,
   wherein the controller is configured to operate the driver to rotate the LED portion at a predetermined rotation speed and to implement the selected operation pattern by allowing the one or more LED elements to emit light according to the rotation angle of the LED portion; and wherein the controller is configured to detect a variation in angular velocity of the LED portion due to inertia generated according to a vehicle attitude and to vary an emission timing of the one or more LED elements according to the detected variation in angular velocity.

6. A vehicle lamp apparatus with a rotating light source, the vehicle lamp apparatus comprising:
a light emitting diode (LED) portion having one or more LED elements configured to emit light toward an outside of the vehicle;
a controller connected to the one or more LED elements and configured to control a light generation amount of the one or more LED elements;
a driver coupled to the LED portion and configured to rotate the LED portion;
a signal receiver which is connected to the one or more sensors mounted in a vehicle and receives a signal from the one or more sensors;
a driving force generator configured to select a driving level in a response to the signal and apply the selected driving level to the driver; and
a signal transmitter configured to receive the signal from the signal receiver and to transmit the received signal to the driving force generator,
wherein the controller is configured to vary a number of revolutions of the LED portion according to the selected driving level,
wherein a position signal transmitter is provided on a side of the driver,
wherein a position signal receiver configured to detect the position signal transmitter is provided in the LED portion,
wherein when the position signal transmitter is detected, the position signal receiver transmits a detection signal to the controller, and
wherein the controller is configured to control the light generation amount of the one or more LED elements in a response to the detection signal.

7. The vehicle lamp apparatus of claim 6, wherein the controller is configured to detect the number of revolutions of the LED portion and to control light generation amount of the one or more LED elements according to a variation of the number of revolutions of the LED portion.

8. The vehicle lamp apparatus of claim 6, wherein
the signal includes an angle with respect to a precedent vehicle and an outside image of the vehicle;
the driving force generator receives a lamp auto switch operation signal, a high beam operation signal, and a number of revolutions of the driver in addition to the signal;
the driving force generator selects an operation pattern among one or more stored operation patterns in a response to the received signal;
the LED portion rotates with a predetermined number of revolutions according to the selected operation pattern; and
the controller is configured to control light emission of the one or more LED elements to implement the selected operation pattern whenever the LED portion rotates once.

9. The vehicle lamp apparatus of claim 8, wherein
the LED portion includes one or more rotating plates fixed to a rotation shaft; and
whenever the number of revolutions of the LED portion is a value which is obtained by dividing a turn-on frequency of the one or more LED elements by a number of the one or more rotating plates, the controller is configured to control the light emission of the one or more LED elements to implement the operating pattern selected by the signal transmitter.

10. The vehicle lamp apparatus of claim 8, wherein, when the number of revolutions of the LED portion increases, the controller is configured to recognize as code 1, when the number of revolutions of the LED portion decreases, the controller is configured to recognize as code 0, and whenever a combination of code 1 and code 0, which is recognized during a unit time, is changed, the controller is configured to control the light emission of the one or more LED elements to implement the operation pattern selected by the signal transmitter.

11. The vehicle lamp apparatus of claim 6, wherein the LED portion includes one or more rotating plates which are fixed to a rotation shaft protruding from the driver toward the outside of the vehicle and form an angle ranging from 0 to 180 degrees in a direction of the rotation shaft and in a direction of the outside of the vehicle.

12. The vehicle lamp apparatus of claim 11, wherein
the one or more rotating plates are in a form of a disc, and a center portion of the one or more rotating plates is connected to an end portion of the rotation shaft;
the one or more LED elements have a quadrangular shape;
the one or more LED elements emit light of one among red, green, blue, or yellow color;
one vertex of a first LED element among the one or more LED elements is mounted to overlap the rotation shaft;
a second LED element among the one or more LED elements is mounted to be farther away in distance from the rotation shaft than the first LED element; and
a third LED element among the one or more LED elements is mounted to be farther away in distance from the rotation shaft than the second LED element.

13. The vehicle lamp apparatus of claim 12, wherein
a side of the second LED element is mounted to be located on a first imaginary line which passes the rotation shaft and a side of the first LED element, and when a portion in which the first LED element is located is a fourth quadrant of a first imaginary circle, the second LED element is located in a second quadrant, and a center portion of the second LED element is located in the first imaginary circle, and simultaneously, a vertex thereof is located on a circumference of the first imaginary circle; and
the first imaginary circle is centering on the rotation shaft and has a diameter which is equal to a diagonal length of the first LED element.

14. The vehicle lamp apparatus of claim 12, wherein
a center portion of the second LED element is mounted to be located on a first imaginary line connecting the rotation shaft to and a center portion of the first LED element, and the center portion of the second LED element is located in a first imaginary circle; and
the first imaginary circle is centering on the rotation shaft and has a diameter which is equal to a diagonal length of the first LED element.

15. The vehicle lamp apparatus of claim 14, wherein
a center portion of the third LED element is mounted to be located on a second imaginary line which is perpendicular to the first imaginary line and passes the rotation shaft, and the third LED element is located in a second imaginary circle centering on the rotation shaft, and simultaneously, located outside the first imaginary circle;

the second imaginary circle has a diameter which is equal to or less than two times the diagonal length of the first LED element;

the third LED element includes a third-first LED element and a third-second LED element; and the third-first LED element and the third-second LED element are symmetric about the rotation shaft.

16. The vehicle lamp apparatus of claim 12, wherein three first LED elements are mounted to have a same angle about the rotation shaft.

17. The vehicle lamp apparatus of claim 16, wherein three second LED elements are mounted to have a same angle about the rotation shaft and located outside a first imaginary circle, and simultaneously, located in a second imaginary circle, and centers of the three second LED elements are located on three first imaginary line extending from the rotation shaft toward centers of the three first LED elements;

the first imaginary circle is centering on the rotation shaft and has a diameter which is equal to a diagonal length of the first LED element; and the second imaginary circle is centering on the rotation shaft and has a diameter which is equal to or less than two times the diagonal length of the first LED element.

18. The vehicle lamp apparatus of claim 6, wherein the controller flickers a predetermined number of the one or more LED elements provided in the LED portion according to a rotation angle of the LED portion and varies a dimming time, during which the flickering LED element among the one or more LED elements is turned off or on , according to a rotation speed of the LED portion; and the dimming time increases as a size of the flickering LED element is increased, as a position of the flickering LED element is closer to the rotation shaft protruding from the driver toward the outside of the vehicle, and as the rotation speed of the LED portion decreases.

19. The vehicle lamp apparatus of claim 6, wherein the vehicle lamp apparatus is applied to a rear combination lamp.

* * * * *